(12) United States Patent
Ishii

(10) Patent No.: US 10,674,380 B2
(45) Date of Patent: Jun. 2, 2020

(54) ON-DEMAND SYSTEM INFORMATION FOR WIRELESS TERMINAL IN CONNECTED STATE

(71) Applicant: SHARP Laboratories of America, Inc., Camas, WA (US)

(72) Inventor: Atsushi Ishii, Vancouver, WA (US)

(73) Assignee: Sharp Laboratories of America, Inc., Vancouver, WA (US)

( * ) Notice: Subject to any disclaimer, the term of this patent is extended or adjusted under 35 U.S.C. 154(b) by 0 days.

(21) Appl. No.: 16/052,760

(22) Filed: Aug. 2, 2018

(65) Prior Publication Data

US 2019/0045379 A1 Feb. 7, 2019

Related U.S. Application Data

(60) Provisional application No. 62/541,430, filed on Aug. 4, 2017.

(51) Int. Cl.
*H04W 24/02* (2009.01)
*H04W 48/10* (2009.01)
(Continued)

(52) U.S. Cl.
CPC ....... *H04W 24/02* (2013.01); *H04W 36/0066* (2013.01); *H04W 48/10* (2013.01);
(Continued)

(58) Field of Classification Search
CPC ..... H04W 36/14; H04W 48/14; H04W 92/20; H04W 72/04; H04W 36/00
See application file for complete search history.

(56) References Cited

U.S. PATENT DOCUMENTS

| 2012/0026972 A1* | 2/2012 | Miao .............. H04W 36/0072 370/331 |
| 2015/0271845 A1 | 9/2015 | Petermann et al. |

(Continued)

FOREIGN PATENT DOCUMENTS

WO    WO-2018128019 A1 *  7/2018

OTHER PUBLICATIONS

International Search Report and Written Opinion dated Oct. 19, 2018 in PCT application PCT/US2018/044932.

(Continued)

*Primary Examiner* — Nizar N Sivji
(74) *Attorney, Agent, or Firm* — Nixon & Vanderhye P.C.

(57) ABSTRACT

The technology disclosed herein concerns, e.g., apparatus, methods, and procedures for obtaining SIBs in Other SI (Other SI SIBs) in on-demand basis during RRC_CONNECTED state. A wireless terminal, which communicates over a radio interface with access nodes of a radio access network (RAN), comprises processor circuitry and receiver circuitry. The processor circuitry is configured to establish a radio connection and cause the wireless terminal to enter a connected state. The receiver circuitry is configured to receive a reconfiguration message via a dedicated signaling while in the connected state. The reconfiguration message includes a first type system information including scheduling information of one or more second type system information blocks (SIBs) and at least one delivery mode indication for the second type SIBs, the delivery mode indication being either periodic broadcast or on-demand basis.

8 Claims, 21 Drawing Sheets

(51) Int. Cl.
H04W 36/00 (2009.01)
H04W 48/12 (2009.01)
H04W 36/38 (2009.01)
H04W 36/08 (2009.01)
H04W 48/14 (2009.01)

(52) U.S. Cl.
CPC ........ *H04W 48/12* (2013.01); *H04W 36/0072* (2013.01); *H04W 36/08* (2013.01); *H04W 36/38* (2013.01); *H04W 48/14* (2013.01)

(56) References Cited

U.S. PATENT DOCUMENTS

| | | |
|---|---|---|
| 2016/0112931 A1 | 4/2016 | Cui et al. |
| 2016/0269956 A1 | 9/2016 | Sawhney et al. |
| 2017/0135121 A1 | 5/2017 | Eyuboglu et al. |
| 2017/0289854 A1* | 10/2017 | Chang .................. H04W 76/27 |
| 2018/0220361 A1* | 8/2018 | Cheng .................. H04L 5/0053 |

OTHER PUBLICATIONS

U.S. Appl. No. 15/658,980, filed Jul. 25, 2017, entitled "On-Demand System Information for Wireless Telecommunications".
U.S. Appl. No. 15/659,027, filed Jul. 25, 2017, entitled Wireless Telecommunications Methods and Apparatus Using System Information Value Tag.
U.S. Appl. No. 15/659,060, filed Jul. 25, 2017, entitled Wireless Telecommunications Methods and Apparatus With Automatic Broadcast After Update of System Information.
U.S. Appl. No. 15/659,085, filed Jul. 25, 2017, entitled Wireless Telecommunications Methods and Apparatus Using System Information Value Tag.
U.S. Appl. No. 62/420,118, filed Nov. 10, 2016, entitled Wireless Telecommunications Methods and Apparatus Comprising Change of Delivery Mode for System Information.
U.S. Appl. No. 62/433,711, filed Dec. 13, 2016, entitled Wireless Telecommunications Methods and Apparatus Comprising Advance Notification of Change of System Information.
R2-1706335, 3GPP TSG-RAN2#AH2, OPPO, "Consideration on Remaining Issues of On-Demand SI", Qingdao, P. R. China, Jun. 27-29, 2017.
R2-1706407, 3GPP TSG-RAN2#AH2, CATT, "Additional indicator in support of on-demand SI Request", Qingdao, P. R. China, Jun. 27-29, 2017.
R2-1706447, 3GPP TSG-RAN2#AH2, Spreadtrum Communications. "Additional indicator for on demand SI scheduling", Qingdao, P. R. China, Jun. 27-29, 2017.
R2-1706499, 3GPP TSG-RAN2#AH2, Ericsson, "On-demand system information procedure", Qingdao, P. R China, Jun. 27-29, 2017.
R2-1706527, 3GPP TSG-RAN2#AH2, Samsung, "On Demand SI: Remaining Issues", Qingdao, P. R. China, Jun. 27-29, 2017.
R2-1706566, 3GPP TSG-RAN2#AH2, Fujitsu, "Multiple other SI requests in MSG1", Qingdao, P. R. China, Jun. 27-29, 2017.
R2-1706607, 3GPP TSG-RAN2#AH2, MediaTek Inc., "On-demand SI broadcast", Qingdao, P. R. China, Jun. 27-29, 2017.
R2-1706697, 3GPP TSG-RAN2#AH2, InterDigital Inc., "On Demand SI Request Procedure", Qingdao, P. R. China, Jun. 27-29, 2017.
R2-1706768, 3GPP TSG-RAN2#AH2, Huawei, HiSilicon, "On demand SI acquisition and failure handling", Qingdao, P. R. China, Jun. 27-29, 2017
R2-1706824, 3GPP TSG-RAN2#AH2, Nokia, Alcatel-Lucent Shanghai Bell, "SI Request and Delivery using Msg 3 Approach", Qingdao, P. R. China, Jun. 27-29, 2017.
R2-1706854, 3GPP TSG-RAN2#AH2, ITL, "Considerations on On-demand SI request", Qingdao, P. R. China, Jun. 27-29, 2017.
R2-1706872, 3GPP TSG-RAN2#AH2, Xiaomi, "Remain issues of on-demand SI", Qingdao, P. R. China, Jun. 27-29, 2017.
R2-1706934, 3GPP TSG-RAN2#AH2, Coolpad, "Discussion on Additional Bit to Indicate Broadcasted On-demand SI", Qingdao, P. R. China, Jun. 27-29, 2017.
R2-1706954, 3GPP TSG-RAN2#AH2, ETRI, "Further discussion on Other SI broadcast indication", Qingdao, P. R. China, Jun. 27-29, 2017.
R2-1706973, 3GPP TSG-RAN2#AH2, vivo, "On demand SI General Procedure", Qingdao, P. R. China, Jun. 27-29, 2017.
R2-1707090, 3GPP TSG-RAN2#AH2, Lenovo, Motorola Mobility, "Summary of [98#34] [NR] On demand SI (Lenovo)", Qingdao, P. R China, Jun. 27-29, 2017.
R2-1707092, 3GPP TSG-RAN2#AH2, Lenovo, Motorola Mobility, "Remaining Issues in On demand SI Request", Qingdao, P. R. China, Jun. 27-29, 2017.
R2-1707180, 3GPP TSG-RAN2#AH2, LG Electronics Inc., "On-demand SI delivery procedure", Qingdao, P. R. China, Jun. 27-29, 2017.
R2-1707317, 3GPP TSG-RAN2#AH2, Qualcomm Incorporated, Sony, NTT Docomo, Inc., ZTE, Sanechips,"Consideration on on-demand SI TX request in NR", Qingdao, P. R. China, Jun. 27-29, 2017.
R2-1707379, 3GPP TSG-RAN2#AH2, NEC, "On demand SI request at RLAU", Qingdao, P. R. China, Jun. 27-29, 2017.
R2-1707456, 3GPP TSG-RAN2#AH2, Xiaomi, "Remain issues of on-demand SI", Qingdao, P. R. China, Jun. 27-29, 2017.

* cited by examiner

ON-DEMAND SYSTEM INFORMATION FOR WIRELESS TERMINAL IN CONNECTED STATE

This application claims the priority and benefit of U.S. Provisional Patent application 62/541,430, filed Aug. 4, 2017, which is incorporated herein by reference in its entirety.

TECHNICAL FIELD

The technology relates to wireless communications, and particularly to methods and apparatus for requesting, transmitting, and using system information (SI) in wireless communications.

BACKGROUND

In wireless communication systems, a radio access network generally comprises one or more access nodes (such as a base station) which communicate on radio channels over a radio or air interface with plural wireless terminals. In some technologies such a wireless terminal is also called a User Equipment (UE). A group known as the 3rd Generation Partnership Project ("3GPP") has undertaken to define globally applicable technical specifications and technical reports for present and future generation wireless communication systems. The 3GPP Long Term Evolution ("LTE") and 3GPP LTE Advanced (LTE-A) are projects to improve an earlier Universal Mobile Telecommunications System ("UMTS") mobile phone or device standard in a manner to cope with future requirements.

In typical cellular mobile communication systems, the base station broadcasts on the radio channels certain information which is required for mobile stations to access to the network. In Long-Term Evolution (LTE) and LTE Advanced (LTE-A), such information is called "system information" ("SI"). Each access node, such as an evolved NodeB ("eNB") or a gNB in the 5G New Radio (NR) System, broadcasts such system information to its coverage area via a Master Information Block (MIB) and several System Information Blocks (SIBs) on downlink radio resources allocated to the access node.

A wireless terminal ("UE"), after entering a coverage area of an eNB or gNB, is required to obtain all the MIB/SIBs which are necessary to access to the system. For sake of UEs under coverage, the eNB or gNB periodically broadcasts all MIB/SIBs relevant for offered services, where each type of MIB or SIBs is transmitted in a designated radio resource(s) with its own pre-determined/configurable frequency.

This all-broadcast-based periodic delivery method (e.g., collective broadcast of all SIBs, not just those necessary for system access) is efficient under a condition where many UEs are almost always flowing into the coverage area (such as a macro cell). However, this approach may result in wasting valuable radio resources in case of small cell deployment. Therefore, more efficient methods of SIB transmission are desired.

What is needed, therefore, and an example object of the technology disclosed herein, are methods, apparatus, and techniques for more efficient transmission of system information blocks (SIBs).

SUMMARY

The technology disclosed herein concerns, e.g., apparatus, methods, and procedures for obtaining SIBs in Other SI (Other SI SIBs) in on-demand basis during RRC_CONNECTED state. The technology disclosed herein provides resource efficient methods of distributing system information by, for example, in various differing example embodiment and modes, individually or in combination:

A wireless terminal (UE) in CONNECTED state acquiring availability and delivery method information for on-demand system information blocks (SIBs) by receiving minimum system information.

The minimum system information being broadcasted or delivered via dedicated signaling.

A wireless terminal (UE) sending a request message for on-demand delivery of some of the available SIBs via dedicated signaling or through random access procedure.

A wireless terminal (UE) receiving the requested SIBs via dedicated signaling or by broadcast.

The request message concatenated into another signaling message.

In one of its example aspects, the technology disclosed herein concerns a wireless terminal which communicates over a radio interface with access nodes of a radio access network (RAN). The wireless terminal comprises processor circuitry and receiver circuitry. The processor circuitry is configured to establish a radio connection and cause the wireless terminal to enter a connected state. The receiver circuitry is configured to receive a reconfiguration message via a dedicated signaling while in the connected state. The reconfiguration message includes a first type system information including scheduling information of one or more second type system information blocks (SIBs) and at least one delivery mode indication for the second type SIBs, the delivery mode indication being either periodic broadcast or on-demand basis.

In an example embodiment and mode, the reconfiguration message instructs the wireless terminal to perform a handover to a target cell, and the first type system information is to be used for the target cell In an example embodiment and mode the wireless terminal further comprises transmitter circuitry configured to transmit a request message for at least one of the second type SIBs in a case where the delivery mode indication of the SIB is on-demand basis, and the the receiver circuitry further receives the requested second type SIB.

In another of its example aspects, the technology disclosed herein concerns an access node of a radio access network (RAN). The access node comprises processor circuitry and transmitter circuitry. The processor circuitry is configured to establish a radio connection with a wireless terminal and to mark the connection state of the wireless terminal as a connected state. The transmitter circuitry is configured to transmit to the wireless terminal a reconfiguration message via a dedicated signaling while the wireless terminal is in the connected state. The configuration message includes a first type system information including scheduling information of one or more second type system information blocks (SIBs) and at least one delivery mode indication for the second type SIBs, the delivery mode indication being either periodic broadcast or on-demand basis.

In an example embodiment and mode reconfiguration message instructs the wireless terminal to perform a handover to a target cell, and the first type system information is to be used for the target cell.

In an example embodiment and mode the access node further comprises receiver circuitry configured to receive a request message for at least one of the second type SIBs in a case where the delivery mode indication of the SIB is on-demand basis, and the transmitter circuitry further transmits the requested second type SIB.

In yet another of its example aspects the technology disclosed herein concerns a method in a wireless terminal which communicates over a radio interface with access nodes of a radio access network (RAN). In a basic mode the method comprises: establishing a radio connection; entering a connected state; and receiving a reconfiguration message via a dedicated signaling while in the connected state. The reconfiguration message includes a first type system information including scheduling information of one or more second type system information blocks (SIBs) and at least one delivery mode indication for the second type SIBs, the delivery mode indication being either periodic broadcast or on-demand basis.

In an example embodiment and mode, the reconfiguration message instructs the wireless terminal to perform a handover to a target cell, and the first type system information is to be used for the target cell.

In an example embodiment and mode, the method further comprises transmitting a request message for at least one of the second type SIBs in a case where the delivery mode indication of the SIB is on-demand basis, and receiving the requested second type SIB.

In still another example aspect the technology disclosed herein concerns a method in an access node of a radio access network (RAN). In a basic mode the method comprises: establishing a radio connection with a wireless terminal; marking the connection state of the wireless terminal as a connected state; and transmitting to the wireless terminal a reconfiguration message via a dedicated signaling while the wireless terminal is in the connected state. The configuration message includes a first type system information including scheduling information of one or more second type system information blocks (SIBs) and at least one delivery mode indication for the second type SIBs, the delivery mode indication being either periodic broadcast or on-demand basis.

In an example embodiment and mode the reconfiguration message instructs the wireless terminal to perform a handover to a target cell, and the first type system information is to be used for the target cell.

In an example embodiment and mode the method further comprises receiving a request message for at least one of the second type SIBs in a case where the delivery mode indication of the SIB is on-demand basis, and transmitting the requested second type SIB.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 13 is a diagrammatic view illustrating example format of a RRCConnectionReconfiguration message which may be utilized in the third example implementation embodiment and mode.

DETAILED DESCRIPTION

Figure 1:
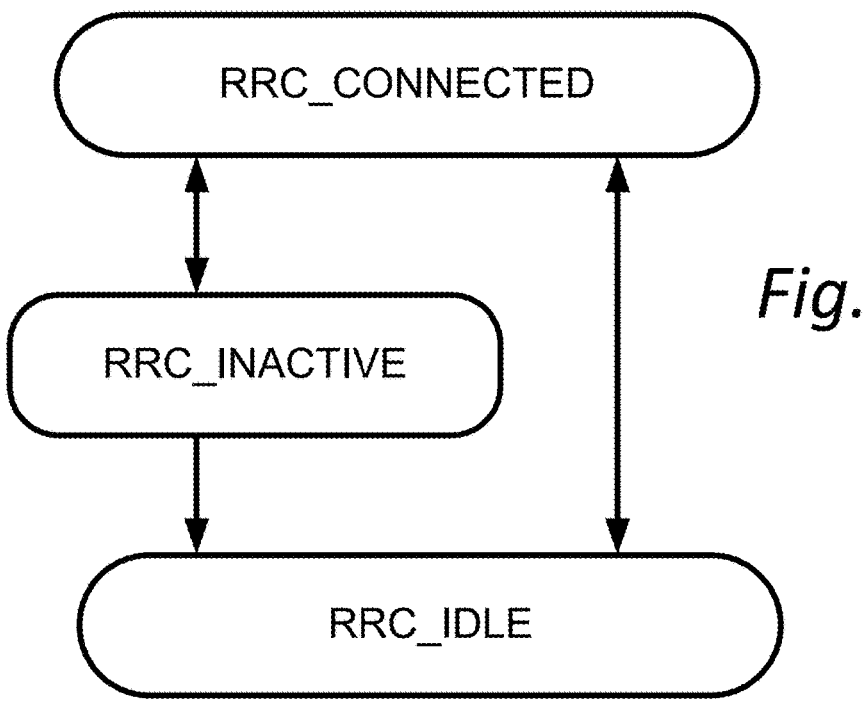
FIG. 1 is a diagrammatic view showing transition states of a Radio Resource Control RRC state machine.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a 5G (New Radio [NR]) gNB, or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, 12, or higher), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information.

As used herein, "system information" ("SI") may include a Master Information Block (MIB) and several System Information Blocks (SIBs) which are provided on downlink radio resources allocated to an access node. The system information may be broadcast, and some types of system information may be provided on demand, e.g., upon receipt of a request for system information from a wireless terminal.

In various aspects of the technology disclosed herein, system information is classified into plural categories or types. In an example embodiment and mode, a first type of the system information is Minimum System Information (Minimum SI), minimally containing information required for UEs initially access to the network, periodically broadcasted by each access node (e.g. eNB for LTE, gNB for 5G Radio System). In some configuration, Minimum System SI may consist of MIB and a limited number of SIBs. The Minimum SI may be also referred as "essential SI", or first type system information.

A second type of system information, e.g., "Other system information, "Other SI", or second type system information contains all the other types of information, i.e., all types of system information except the Minimum System Information. The Other SI may comprise several system information blocks (SIBs) that are not categorized as Minimum SI. The Other SI may be also referred as "non-essential SI". However, the second type system information is not to be confused with SIB Type 2, which is a particular (second) system information block (SIB) that may be included in the Minimum System Information.

In some example embodiment and modes described herein, for each of the SIBs belonging to Other SI, the access node may choose to broadcast the SIB periodically, similar to the SIBs in Minimum SI. Alternatively, the access node may choose to refrain from transmitting the SIB until receiving a request of on-demand delivery from a UE. In this case, the access node may advertise the availability of on-demand delivery using Minimum SI.

As described herein, both an access node and a wireless terminal may manage a respective Radio Resource Control (RRC) state machines. The RRC state machines transition between several RRC states including RRC_IDLE, RRC_INACTIVE and RRC_CONNECTED. FIG. 1 depicts the state transition diagram of the RRC states. From the vantage point of a wireless terminal e.g., user equipment (UE), the RRC states may be briefly characterized as follows:

RRC_IDLE:
  A UE specific DRX (discontinuous reception) may be configured by upper layers;
  UE controlled mobility based on network configuration;
  The UE:
    Monitors a Paging channel;
    Performs neighboring cell measurements and cell (re-) selection;
    Acquires system information.

RRC_INACTIVE:
  A UE specific DRX may be configured by upper layers or by RRC layer;
  UE controlled mobility based on network configuration;
  The UE stores the Access Stratum (AS) context;
  The UE:
    Monitors a Paging channel;
    Performs neighboring cell measurements and cell (re-) selection;
    Performs RAN-based notification area updates when moving outside the RAN-based notification area;
    Acquires system information.

RRC_CONNECTED:
  The UE stores the AS context.
  Transfer of unicast data to/from UE.
  At lower layers, the UE may be configured with a UE specific DRX;
  Network controlled mobility, i.e. handover within NR and to/from E-UTRAN;
  The UE:
    Monitors a Paging channel;
    Monitors control channels associated with the shared data channel to determine if data is scheduled for it;
    Provides channel quality and feedback information;
    Performs neighboring cell measurements and measurement reporting;
    Acquires system information.

The technology disclosed herein concerns, e.g., apparatus, methods, and procedures for obtaining SIBs in Other SI (Other SI SIBs) in on-demand basis during RRC_CONNECTED state.

Figure 2:
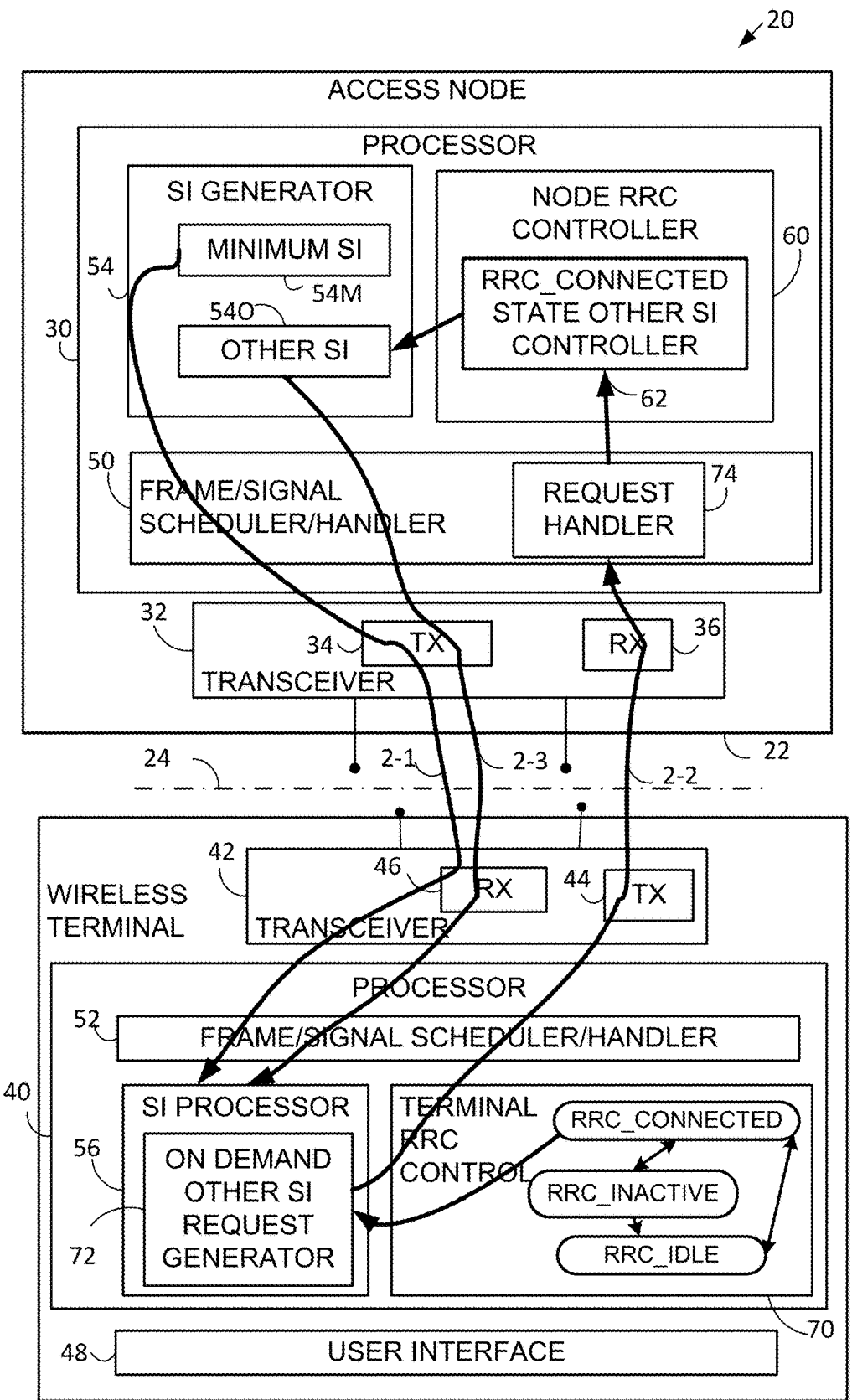
FIG. 2 is a schematic view showing an example generic communications system comprising a radio access node and a wireless terminal, wherein the wireless terminal requests, and the radio access node provides, Other system information (Other SI) when the wireless terminal is in a RRC_CONNECTED state.

FIG. 2 shows an example communications system 20 wherein radio access node 22 communicates over air or radio interface 24 (e.g., Uu interface) with wireless terminal 26. As mentioned above, the radio access node 22 may be any suitable node for communicating with the wireless terminal 26, such as a base station node, or eNodeB ("eNB") or gNB, for example. The node 22 comprises node processor circuitry ("node processor 30") and node transceiver circuitry 32. The node transceiver circuitry 32 typically comprises node transmitter circuitry 34 and node receiver circuitry 36, which are also called node transmitter and node receiver, respectively.

The wireless terminal 26 comprises terminal processor 40 and terminal transceiver circuitry 42. The terminal transceiver circuitry 42 typically comprises terminal transmitter circuitry 44 and terminal receiver circuitry 46, which are also called terminal transmitter 44 and terminal receiver 46, respectively. The wireless terminal 26 also typically comprises user interface 48. The terminal user interface 48 may serve for both user input and output operations, and may comprise (for example) a screen such as a touch screen that can both display information to the user and receive information entered by the user. The user interface 48 may also include other types of devices, such as a speaker, a microphone, or a haptic feedback device, for example.

For both the radio access node 22 and radio interface 24, the respective transceiver circuitries 22 include antenna(s). The transmitter circuit 34 and transmitter circuit 44 may comprise, e.g., amplifier(s), modulation circuitry and other conventional transmission equipment. The receiver circuit 36 and receiver circuit 46 may comprise, e.g., e.g., amplifiers, demodulation circuitry, and other conventional receiver equipment.

In general operation, node 22 and wireless terminal 26 communicate with each other across radio interface 24 using predefined configurations of information. By way of non-limiting example, the radio access node 22 and wireless terminal 26 may communicate over radio interface 24 using "frames" of information that may be configured to include various channels. In Long Term Evolution (LTE), for example, a frame, which may have both downlink portion(s) and uplink portion(s), may comprise plural subframes, with each LTE subframe in turn being divided into two slots. The frame may be conceptualized as a resource grid (a two dimensional grid) comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. The frame and subframe structure serves only as an example of a technique of formatting of information that is to be transmitted over a radio or air interface. It should be understood that "frame" and "subframe" may be utilized interchangeably or may include or be realized by other units of information formatting, and as such may bear other terminology (such as blocks, for example).

To cater to the transmission of information between radio access node 22 and wireless terminal 26 over radio interface 24, the node processor 30 and terminal processor 40 of FIG. 2 are shown as comprising respective information handlers. For an example implementation in which the information is communicated via frames, the information handler for radio access node 22 is shown as node frame/signal scheduler/handler 50, while the information handler for wireless terminal 26 is shown as terminal frame/signal handler 52.

The node processor 30 of radio access node 22 also includes system information (SI) generator 54. As described above, at least some of the system information generated and provided by the node radio resource controller 54 is Minimum System Information (Minimum SI), also known as first type system information, represented by Minimum SI handler 54M. Some of the system information may be Other system information (Other IS), also known as second type system information, represented by Other SI handler 54O in FIG. 2. The wireless terminal 26 uses the system information (SI) generated by radio access node 22. Some of the Minimum SI may inform the wireless terminal 26 of the availability of the Other IS. FIG. 2 illustrates a generic message 2-1 by which the node radio resource controller 54 may supply the Minimal SI to wireless terminal 26. In some example implementations, upon knowing of the availability of the Other IS, due to the message 2-1, for example, the wireless terminal 26 specifically requests the Other system information, in on-demand fashion, as described herein. The terminal processor 40 of wireless terminal 26 comprises, e.g., SI processor 56, to facilitate obtaining and use of system information.

The technology disclosed herein concerns, e.g., apparatus, methods, and procedures for obtaining system information blocks (SIBs) in/of the Other SI (Other SI SIBs) in on-demand basis during RRC_CONNECTED state. Since the technology disclosed herein involves the Radio Resource Control (RRC) procedures, FIG. 2 shows node processor 30 as comprising node radio resource control (RRC) controller 60, e.g., node RRC controller 60. The node RRC controller 60 may execute an instance of the RRC state machine for each wireless terminal in which the access node 20 is in communication, with each instance keeping track of the RRC state transitions experienced by the wireless terminal associated with the respective instance. For sake of simplification, node RRC controller 60 is shown in FIG. 2 as comprising RRC_CONNECTED state Other SI sub-controller 62, also known as RRC_CONNECTED state Other SI controller 62.

FIG. 2 also shows the terminal processor 40 of wireless terminal 26 as comprising, in addition to terminal SI processor 56, a terminal RRC controller 70. The terminal RRC controller 70 includes or executes the RRC state machine discussed above, which transitions through the RRC states (as described above and shown in FIG. 2) for a communication involving wireless terminal 26. An aspect of the technology disclosed herein comprises, when the wireless terminal 26 is in the RRC_CONNECTED state, the wireless terminal 26 requesting the Other system information (Other SI) from the access node 22. FIG. 2 particularly shows the terminal SI processor 56 as comprising Other system information (Other SI) request generator 72, which serves to send a request message to access node 22 when the wireless terminal 26 is in the RRC_CONNECTED state and needs the Other system information (Other SI) from the access node 22. The request message generated by Other SI request generator 72, depicted as message 2-2 in FIG. 2, is initially processed by request handler 74 of the node frame/signal scheduler/handler 50, and then referred to the RRC_CONNECTED state Other SI controller 62. The RRC_CONNECTED state Other SI controller 62 causes the node radio resource controller 54 to generate an Other SI response message, depicted as message 2-3 in FIG. 2.

FIG. 2 thus shows that the access node 22 comprises node processor 30 (e.g., node processor circuitry 30), transmitter circuit 34, and, receiver circuit 36. The transmitter circuit 34 is configured to transmit the first type system information over a radio interface, the first type system information including availability of a second type system information block (SIB). The node processor 30 is configured to: (1) establish a radio connection with a wireless terminal; and, (2) mark the connection state of the wireless terminal as a connected state. The receiver circuit 36 is configured to receive from the wireless terminal in the connected state a request message to request delivery of the second type SIB which is available by on-demand basis. The transmitter circuit 34 is further configured to transmit the second type SIB to the wireless terminal.

FIG. 2 thus shows that the wireless terminal 26 communicates over radio interface 24 with access nodes, such as access node 22, of a radio access network (RAN). The wireless terminal 26 comprises receiver circuit 46, transmitter circuit 44, and terminal processor 40, e.g., terminal processor circuitry. The receiver circuit 46 is configured to receive first type system information over the radio interface. The terminal processor circuitry is configured to: establish a radio connection; cause the wireless terminal to enter a connected state; and, generate a request message to request the second type SIB available in an on-demand basis. The transmitter circuit 44 is configured to transmit the request message over the radio interface while in the connected state. The receiver circuit 46 is also configured to receive the second type SIB while in the connected state.

Figure 3:
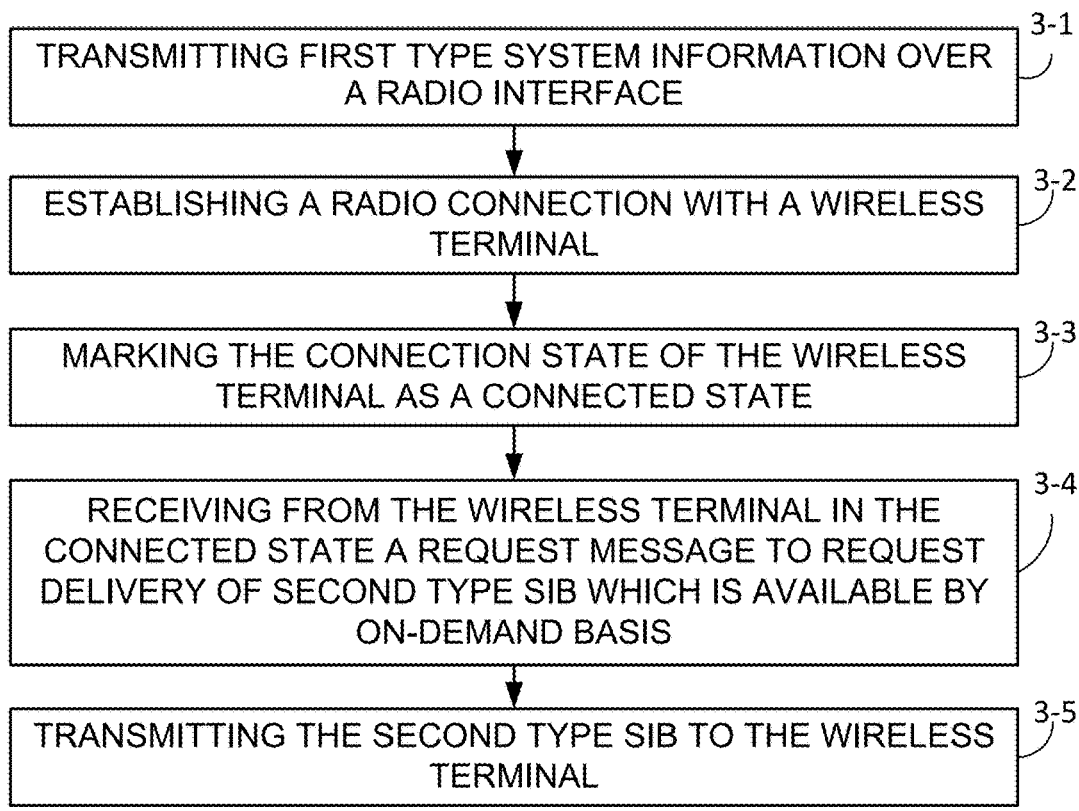
FIG. 3 is a flowchart showing example, basic example acts or steps performed by an access node of the example generic communications system of FIG. 2.

FIG. 3 shows example, representative acts or steps performed in conjunction with a generic method of operating an access node of a radio access network (RAN), such as access node 22 of FIG. 2. Act 3-1 comprises transmitting first type system information (e.g., the Minimal SI) over a radio interface. Such transmission of first type system information is generically shown by message 2-1 in FIG. 2. The first type system information includes availability of a second type system information block (SIB) and may optionally include an indication of a delivery mode for the available second type SIB. The delivery mode may be either periodic broadcast or on-demand basis. Act 3-2 comprises establishing a radio connection with a wireless terminal. Act 3-3 comprises marking the connection state of the wireless terminal as a connected state. "Marking the connection state" means that the access node establishes a binding (connection) to the wireless terminal and recognizes the wireless terminal state as CONNECTED. Act 3-4 comprises receiving from the wireless terminal, in the connected state, a request message to request delivery of second type SIB which is available by on-demand basis. Such request message is generically depicted as message 2-2 in FIG. 2. Act 3-5 comprises transmitting the second type SIB to the wireless terminal, e.g., in a generic message such as message 2-3 shown in FIG. 2.

Figure 4:
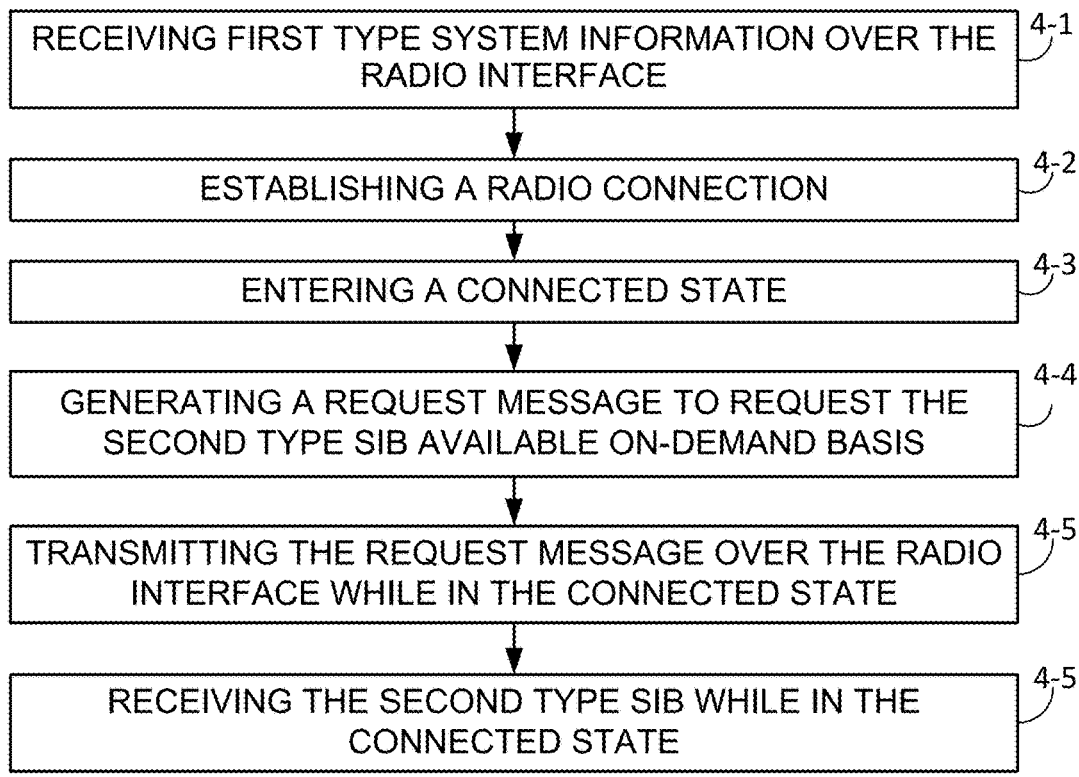
FIG. 4 is a flowchart showing example, basic example acts or steps performed by a wireless terminal of the example generic communications system of FIG. 2.

FIG. 4 shows example, representative acts or steps performed in conjunction with a generic method of operating a wireless terminal, such as wireless terminal 26 of FIG. 2, which communicates over a radio interface 24 with an access node of a radio access network (RAN). Act 4-1 comprises receiving first type system information over the radio interface. The first type system information may be received from access node 22 in a message such as generic message 2-1 shown in FIG. 1. As explained above, the first type system information may include availability of a second type system information block (SIB) and an indication of a delivery mode for the available second type SIB, and the delivery mode may be either periodic broadcast or on-demand basis. Act 4-2 comprises establishing a radio connection. Act 4-3 comprises the wireless terminal entering a connected state (e.g., under supervision of terminal RRC controller 70). Act 4-4 comprises the wireless terminal, and Other SI request generator 72 in particular, generating a request message to request the second type SIB available on-demand basis. Act 4-5 comprises the wireless terminal transmitting the request message over the radio interface while in the connected state. The request message generated by act 4-4 and transmitted by act 4-5 is depicted by the generic message 2-2 of FIG. 2. Act 4-6 comprises the wireless terminal receiving the second type SIB while in the connected state. The generic message 2-3 of FIG. 2 illustrates reception by the wireless terminal 26 of the second type SIB, e.g., reception of the Other system information (Other SI).

It was mentioned above that the first type system information may include availability of a second type system information block (SIB), that the request message requests delivery of a second type SIB which is available by on-demand basis, and that the second type SIB is transmitted to the wireless terminal. It should be understood that reference herein to "a second type system information block (SIB)", or "a second type SIB", means one or more pieces of Other system information (Other SI), e.g., one or more second type system information blocks (SIBs). In some example situations indeed only one second type SIB may be advertised as available and accordingly requested on-demand. But in other example situations, indeed in most situations, typically plural second type SIBs (e.g., plural pieces of Other SI) are advertised as available and requested on-demand.

The generic example embodiment and mode of FIG. 2, FIG. 3, and FIG. 4 may be implemented in various different further example embodiment and modes. These further example embodiment and modes, building upon the generic technology described above, may be implemented either individually or in combination.

1.0 First Example Implementation Embodiment

Figure 5:
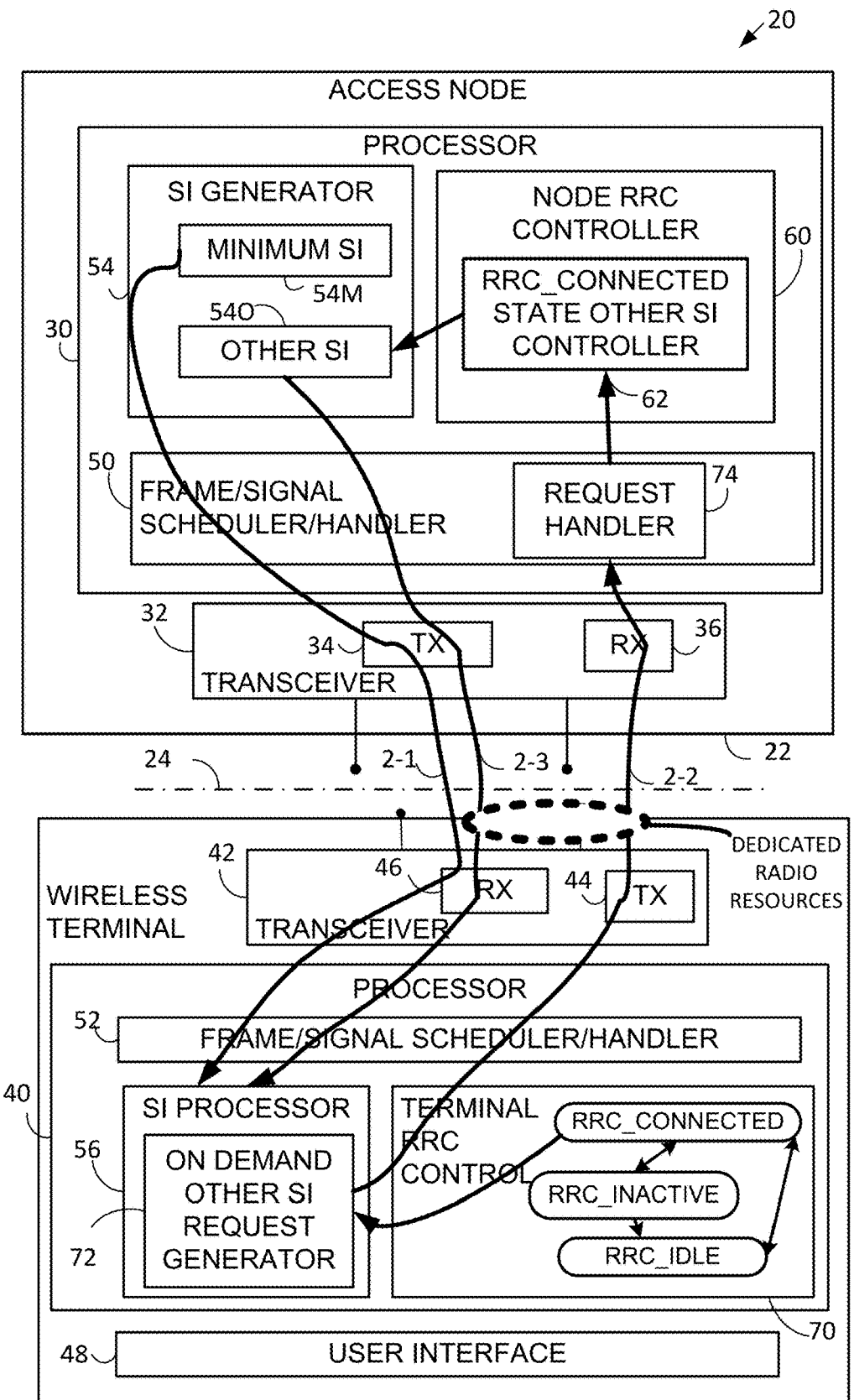
FIG. 5 is a schematic view showing an example implementation example embodiment and mode of a communications system wherein Other system information (Other SI) is both requested and delivered using dedicated radio resources.

In a first example implementation embodiment and mode, Other system information (Other SI) SIB(s) is/are both requested and delivered using dedicated resources. Several example situational variations of the first example implementation embodiment and mode are described herein. FIG. 5 shows an example first implementation embodiment and mode of a communications system wherein Other system information (Other SI) is both requested and delivered using dedicated radio resources. The elements and features of FIG. 5 that are similarly labeled as corresponding elements and features of FIG. 2 have comparable structure and function as previously described. The generic acts of FIG. 3 and FIG. 4 also encompass the acts of the first example implementation embodiment and mode, in all of its example situation variations.

Figure 6:
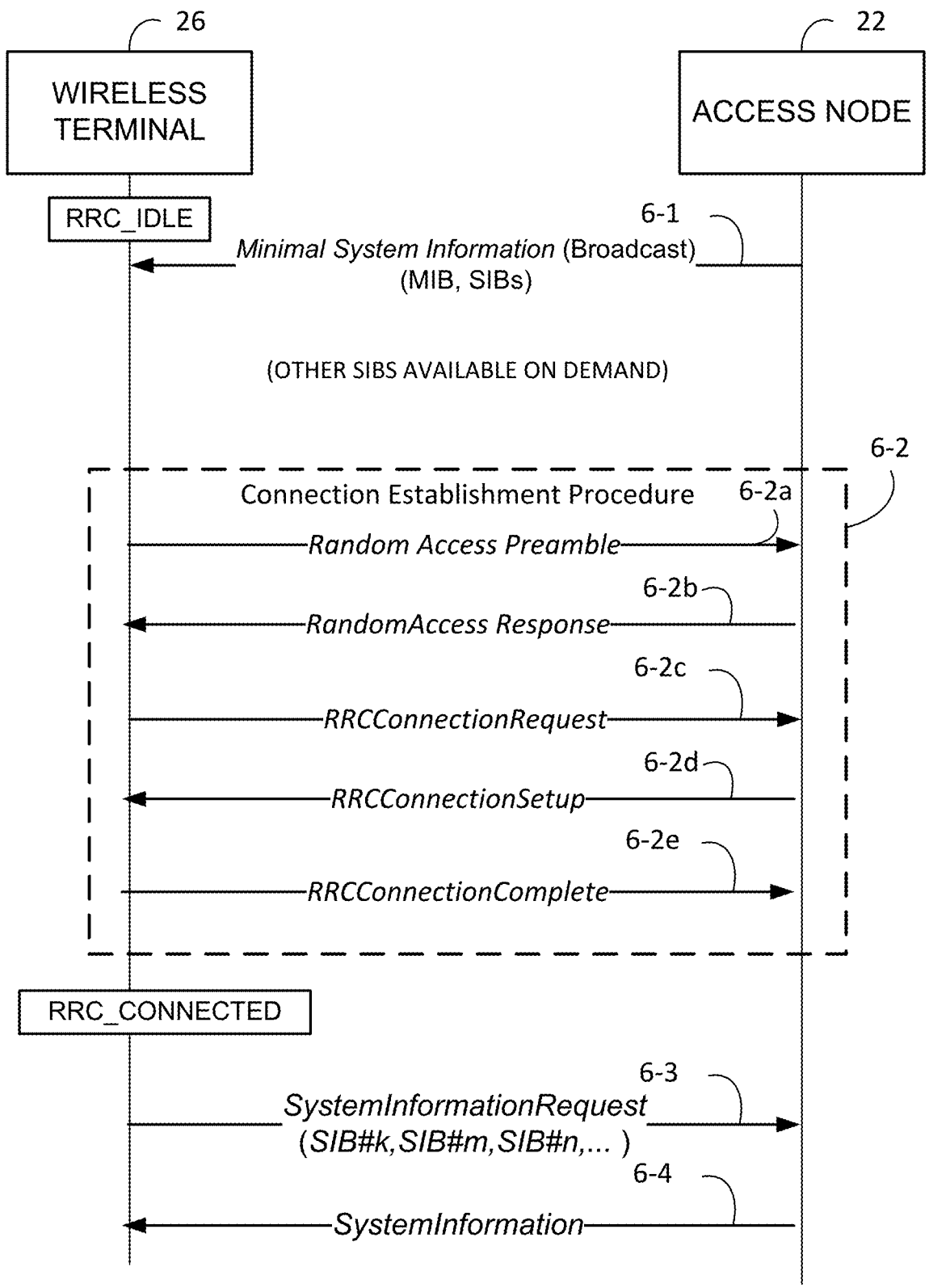
FIG. 6 is a signal diagram for a first example situational variation of the first example implementation embodiment and mode.

FIG. 6 shows a first example situational variation of the first example implementation embodiment and mode, and is based on a unicast delivery using radio resources dedicated to the requesting wireless terminal. When in RRC_IDLE state, the wireless terminal 26 may acquire Minimum SI from the camping cell controlled by gNB1. In some example configurations, MIB or one of the SIBs in Minimum SI (e.g. SIB type 1) may contain information about Other SI, including available SIB types and the delivery method (periodic broadcast or on-demand) for each SIB. For example, FIG. 6 shows the wireless terminal 26 acquiring the Minimal SI and the information about the Other system information (Other SI) in message 6-1, which is an implementation of generic message 2-1 of FIG. 2. After acquiring Minimum SI the wireless terminal 26 may initiate the connection establishment procedure 6-2 of FIG. 6. The connection establishment procedure 6-2 comprises a RandomAccessPreamble message 6-2a, AccessResponse message 6-2b, RRCConnectionRequest message 6-2c, RRCConnectionSetup message 6-2d, and RRCConnectionComplete message 6-2e. Performance of the connection establishment procedure 6-2 results in the wireless terminal 26 entering the RRC_CONNECTED state. In the RRC_CONNECTED state, the wireless terminal 26 may decide to request to the current serving gNB some or all of the SIBs available by on-demand delivery, based on the information in the Minimum SI that the UE obtained in RRC_IDLE.

It is assumed in this FIG. 6 scenario that the Minimum SI is still valid. In some implementation, the Minimum SI may be valid if (1) the UE stays in the same serving area of a cell, (2) a pre-determined or network-configured time duration has not passed since the acquisition, and (3) the wireless terminal 26 has not received a message (e.g. Paging message) indicating that Minimum SI has been updated. Some other conditions may also apply.

Once the wireless terminal 26 decides which SIBs to request for on-demand delivery, the wireless terminal 26 may send a request message (e.g. SystemInformationRequest message 6-3 in FIG. 6) to the currently serving gNB (gNB1), indicating the identities of the requested SIBs, using the dedicated uplink resources. The SystemInformationRequest message 6-3 of FIG. 6 may be an implementation of the generic message 2-2 of FIG. 2. The access node 22 (e.g., gNB) may response back by sending a message including the contents of the requested SIBs (SystemInformation message 6-4 in FIG. 6), using the dedicated downlink resources. In some configuration, these messages are RRC messages, MAC (Media Access Control) level messages, or a combination of those. The SystemInformation message 6-4 is an implementation of the generic message 2-3 of FIG. 2.

Figure 7:
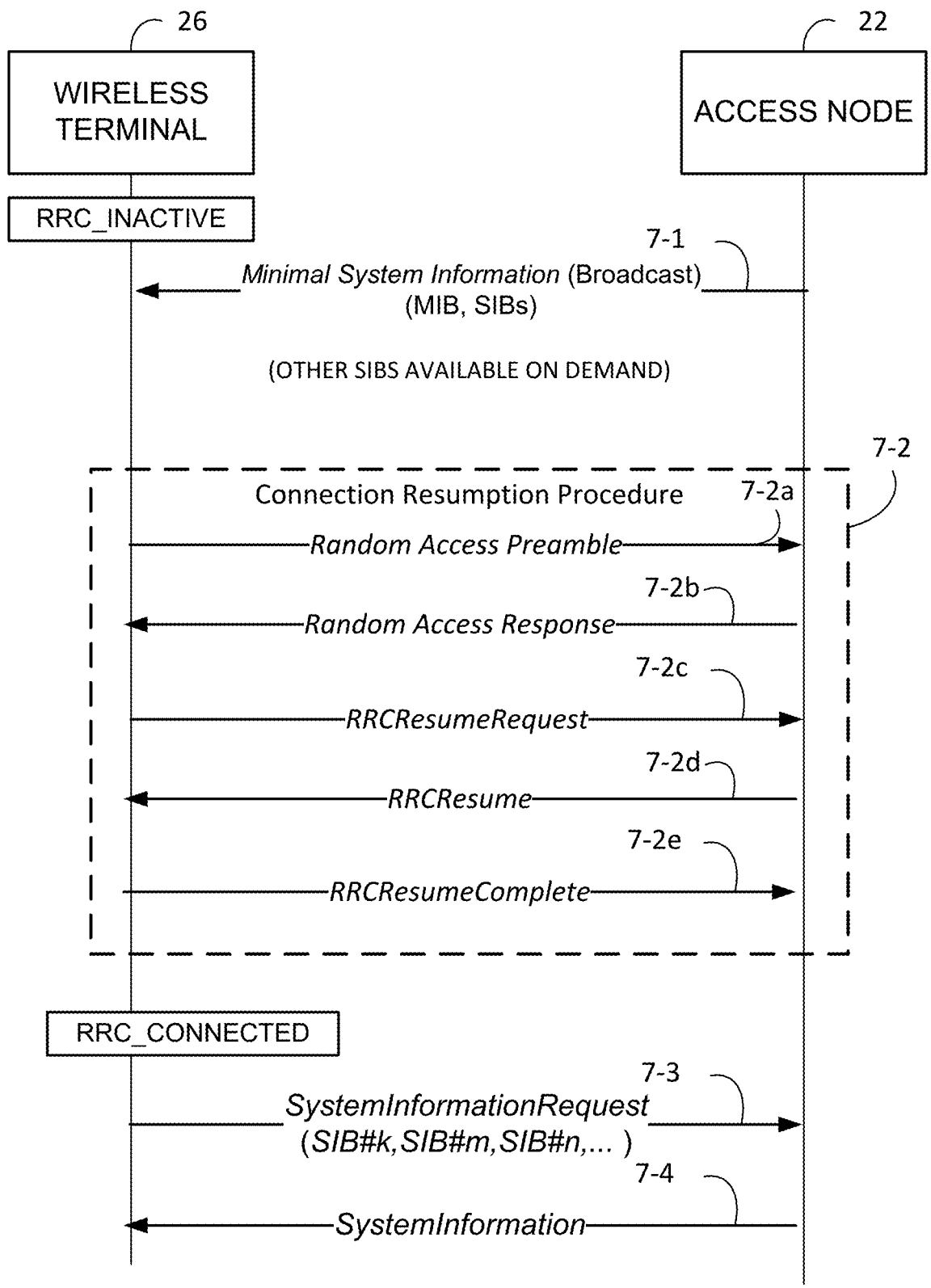
FIG. 7 is a signal diagram for a second example situational variation of the first example implementation embodiment and mode.

FIG. 7 shows a second example situational variation of the first example implementation embodiment and mode. In FIG. 7 the wireless terminal 26 acquires Minimum SI in the RRC_INACTIVE state. The second example situational variation of the first example implementation embodiment and mode involves a Connection Resumption Procedure. The Connection Resumption Procedure comprises RandomAccessPreamble message 7-2a, RandomAccessResponse message 7-2b, RRCResumeRequest message 7-2c, RRCResume message 7-2d, and RRCResumeComplete message 7-2e. Performance of the connection resumption procedure 7-2 results in the wireless terminal 26 entering the RRC_CONNECTED state. As explained above with reference to FIG. 6, in the RRC_CONNECTED state, the wireless terminal 26 may decide to request to the current serving access node (gNB) some or all of the SIBs available by on-demand delivery, based on the information in the Minimum SI that the UE obtained in RRC_IDLE. The other acts of FIG. 7 include the wireless terminal 26 requesting the Other system information (Other SI) (act 7-3) and receiving delivery of the requested Other system information (Other SI) (act 7-4), in comparable manner as understood with similarly suffixed acts of FIG. 6.

Figure 8:
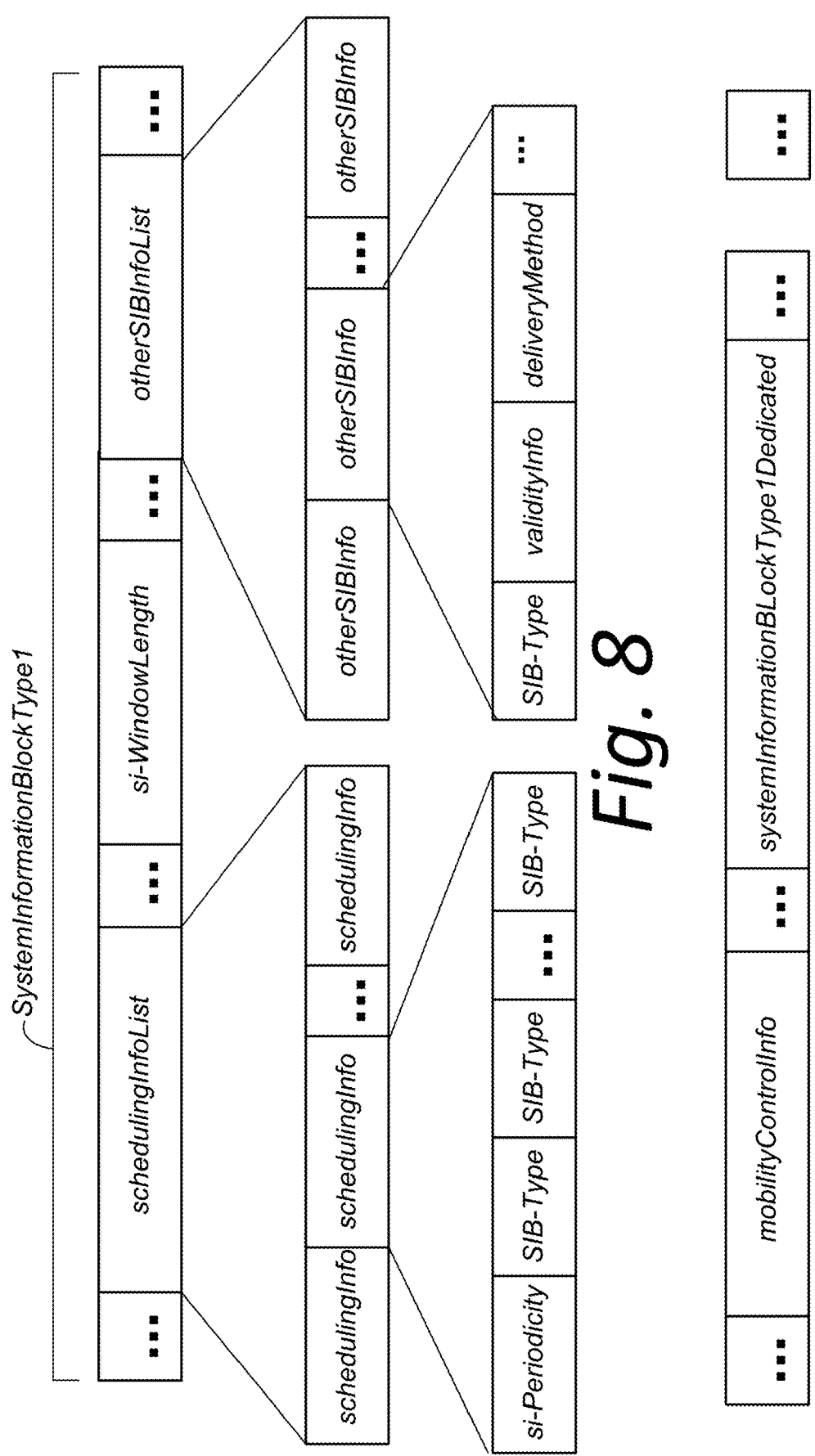
FIG. 8 is a diagrammatic view illustrating example format of a system information block (SIB) which comprises the Minimal SI and which carries availability of Other system information (Other SI).

In some configurations or implementations, the availability and delivery method information for Other SI SIBs may be included one of the SIBs in the Minimum SI, such as System Information Block Type 1 (SIB1) for example. SIB1 may be the first SIB after the MIB in the Minimal SI. FIG. 8 shows an example format of SIB1, including information elements or parameters such as schedulingInfoList, si-WindowLength, otherSIBInfoList and possibly other configuration parameters. The otherSIBInfoList is a list of otherSIB-Info, which comprises SIB-Type, an identifier of a SIB, validityInfo, validity information of the SIB (e.g. a value tag, validity area identification, validity timer, etc.) and deliveryMethod indicating if this SIB is periodically broadcasted or to be transmitted upon request (on-demand). The schedulingInfoList and si-WindowLength are explained herein.

2.0 Second Example Implementation Embodiment

Figure 9:
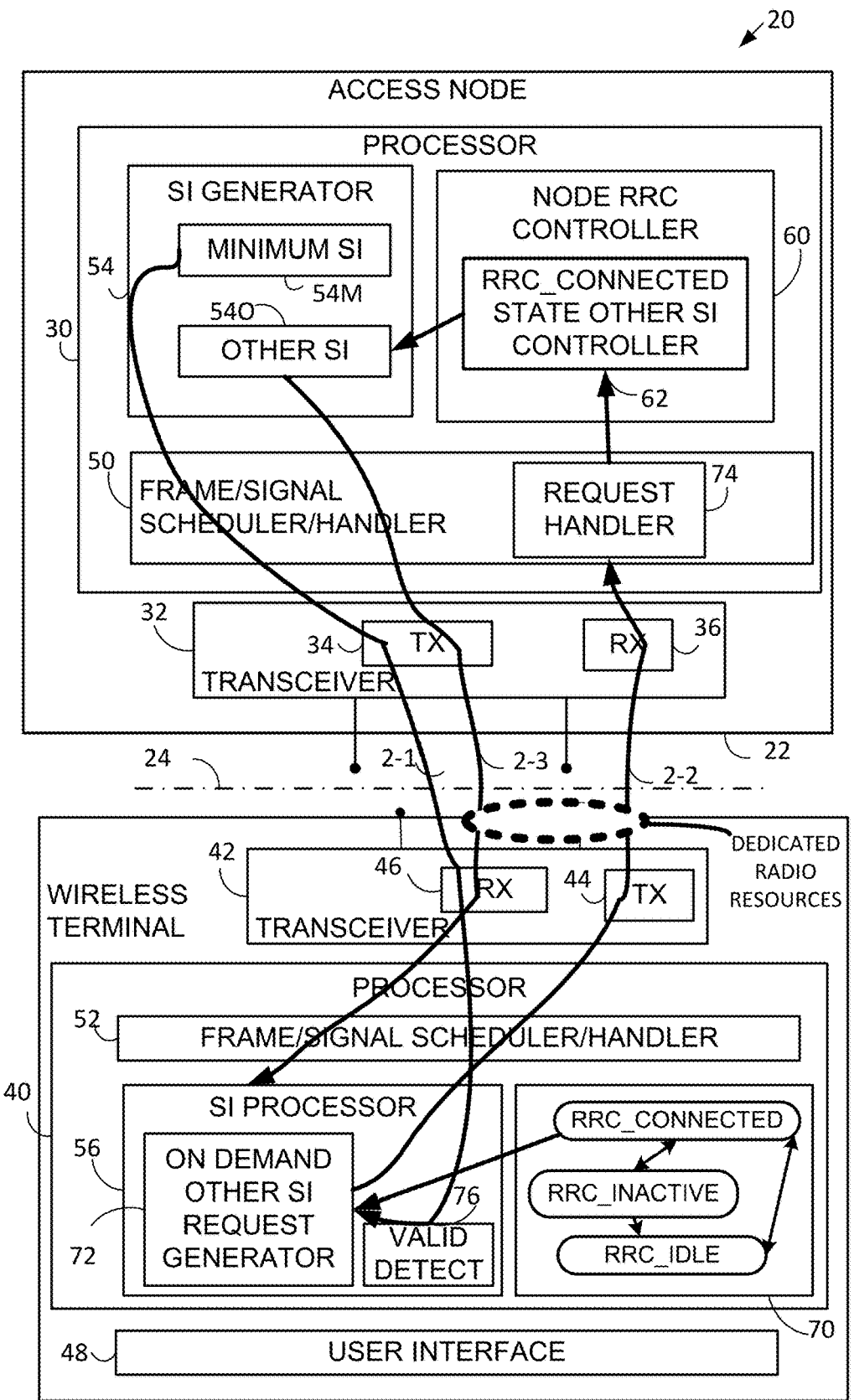
FIG. 9 is a schematic view showing a second example implementation example embodiment and mode of a communications system wherein Other system information (Other SI) is both requested and delivered using dedicated radio resources, but wherein initially obtained Minimal SI is invalid so that Minimal SI must be re-acquired.

In a second example implementation embodiment and mode, Other system information (Other SI) SIB(s) is/are both requested and delivered using dedicated resources. The second example implementation embodiment and mode particularly concerns a case in which the Minimum SI that the wireless terminal 26 acquired in RRC_IDLE or RRC_I-NACTIVE is no longer valid when requesting SIBs in RRC_CONNECTED. FIG. 9 shows an example communications system for the second example implementation embodiment and mode. The elements and features of FIG. 9 that are similarly labeled as corresponding elements and features of FIG. 2 have comparable structure and function as previously described. FIG. 9 further shows that the wireless terminal 26, and particularly terminal SI processor 56, comprises a system information validity detector 76 which is employed to detect the validity (e.g., currency or geographical applicability) of Minimal SI acquired from an access node. The generic acts of FIG. 3 and FIG. 4 also encompass the acts of the second example implementation embodiment and mode.

Figure 10:
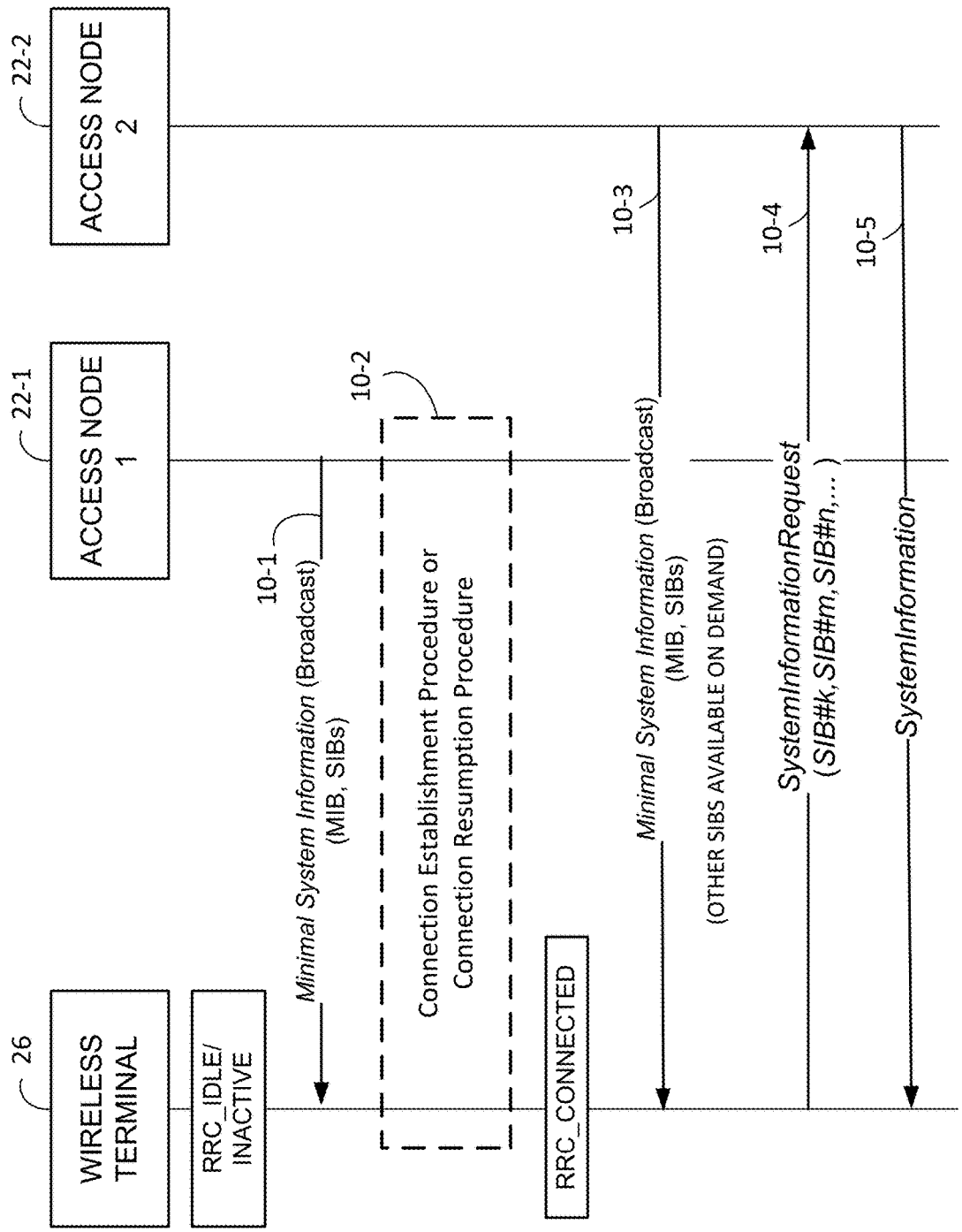
FIG. 10 is an example signal diagram for the second example implementation embodiment and mode.

An example procedure for the second example implementation embodiment and mode is shown in FIG. 9. In FIG. 10 as act 10-1 (an implementation of generic message 2-1) the wireless terminal 26 acquired initial Minimal SI. Act 9-10 reflects performance of either a Connection Establishment Procedure (understood with reference to FIG. 6) or a Connection Resumption Procedure (understood with reference to FIG. 7). As a result of performance of either procedure of act 10-2, the wireless terminal 26 enters the RRC_CONNECTED state. As it turns out, at a time when the wireless terminal is in the RRC_CONNECTED state in the FIG. 10 scenario it is determined, e.g., by system information validity detector 76 of wireless terminal 26, that the Minimal SI acquired is no longer valid. The Minimal SI acquired at step 10-1 may not be valid if, for example, the wireless terminal strays from the cell, or if a validity timer has expired, or the wireless terminal has received a notification indicating an update on the Minimum SI.

As further shown in FIG. 10, as act 10-3 the wireless terminal 26 in RRC_CONNECTED attempts to acquire broadcasted Minimum SI from an access node or gNB, which may or may not be the same access node from which the no-longer valid Minimal SI was previously acquired.

For sake of example illustration, FIG. 10 shows as act 10-3 the wireless terminal 26 in RRC_CONNECTED attempting to acquire broadcasted Minimum SI from another or second access node (access node 22-2 or gNB2. The message of act 10-3 may be an example implementation of generic act 2-1 of FIG. 2. The Minimum SI may contain the identifiers of Other SI SIBs available from access node 2-2 (e.g., gNB2) and the delivery method (periodic broadcast or on-demand), which the wireless terminal may utilize to determine which Other SI SIB identities for on-demand delivery request. Similar to the first example implementation embodiment and mode, the wireless terminal 26 may send a request message (SystemInformationRequest of act 10-4) indicating the SIB identities. The message of act 10-4 may be an example implementation of generic message 2-2 of FIG. 2. FIG. 10 further shows that the wireless terminal 26 receives from an access node (e.g., access node 22-2 or gNB2) a response message (SystemInformation of act 10-5) containing the content of the requested SIBs.

FIG. 10 thus illustrates a case in which the wireless terminal 26, after determining that earlier-acquired Minimal SI is invalid, seeks to obtain valid Minimal SI from another access node. FIG. 9, on the other hand, illustrates that the wireless terminal 26 may again seek valid Minimal SI from the same node, e.g., from access node 22 of FIG. 9. In FIG. 9 the wireless terminal 26 seeks to acquire valid Minimal SI by sending another message 2-1, and should valid Minimal SI be received from access node 22, the wireless terminal 26 makes the Other system information (Other SI) request using message 2-2 and receives the Other system information (Other SI) in message 2-3.

3.0 Third Example Implementation Embodiment

In a third example implementation embodiment and mode, Other system information (Other SI) SIB(s) is/are both requested and delivered using dedicated resources. The third example implementation embodiment and mode particularly concerns a case in which a wireless terminal receives a configuration message which includes Minimal SI for use in conjunction with a handover to a target cell from which the Other system information (Other SI) may be acquired.

Figure 11:
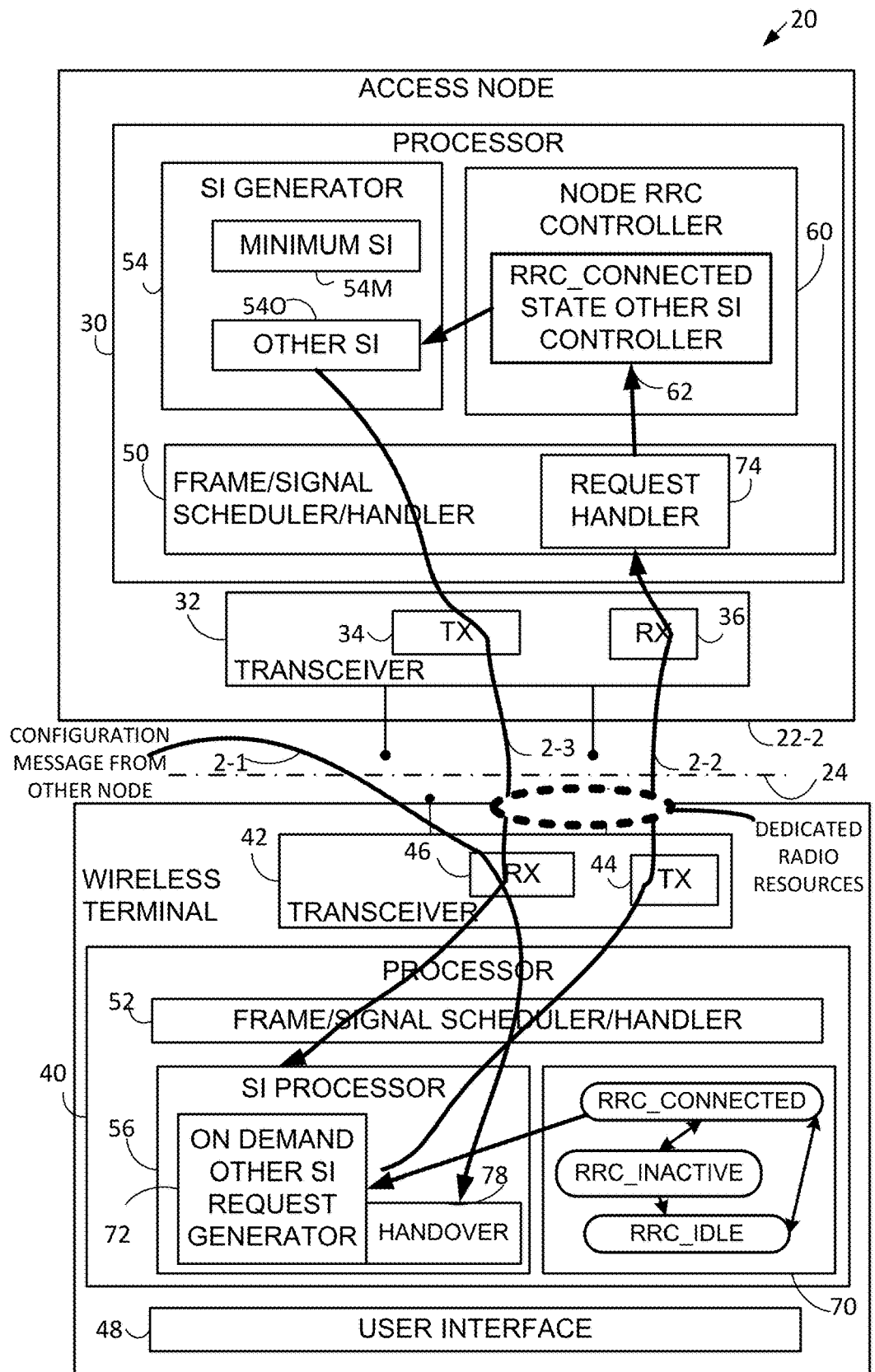
FIG. 11 is a schematic view showing a third example implementation example embodiment and mode of a communications system wherein Other system information (Other SI) is both requested and delivered using dedicated radio resources, but wherein the wireless terminal receives a configuration message which includes Minimal SI for use in a handover to a target cell from which the Other system information (Other SI) may be acquired.

FIG. 11 shows an example communications system for the second example implementation embodiment and mode. The elements and features of FIG. 11 that are similarly labeled as corresponding elements and features of FIG. 2 have comparable structure and function as previously described. FIG. 11 further shows that the wireless terminal 26, and particularly terminal SI processor 56, comprises handover unit 78. The generic acts of FIG. 3 and FIG. 4 also encompass the acts of the third example implementation embodiment and mode.

Figure 12:
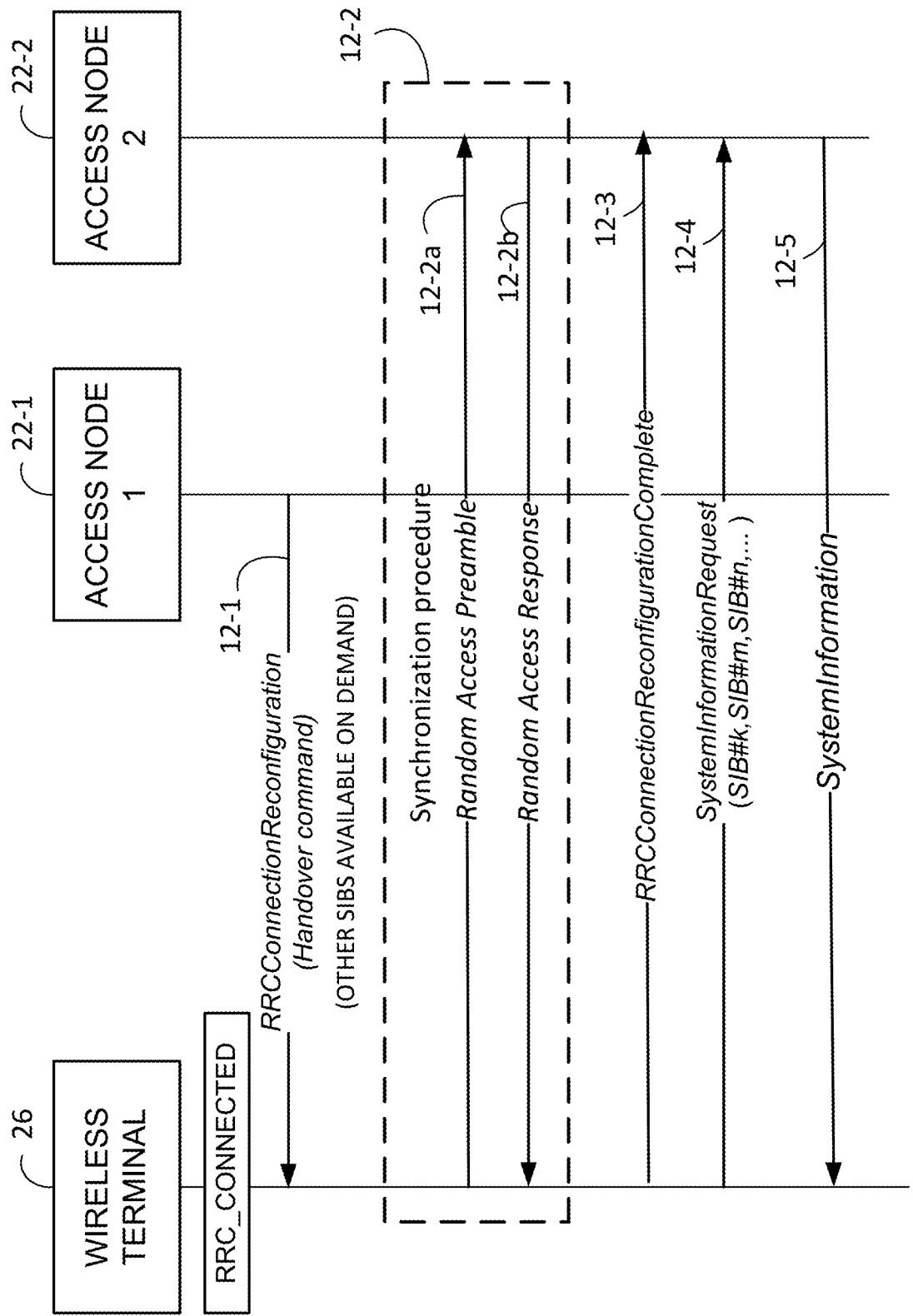
FIG. 12 is an example signal diagram for the third example implementation embodiment and mode.

As shown by the signaling diagram of FIG. 12, in the third example implementation embodiment and mode, the wireless terminal 26 in the RRC_CONNECTED state may receive a configuration message via a dedicated manner. The configuration message of FIG. 12 includes at least the information about the availability and the delivery method of Other SI SIBs. This information may be intended to be used for the cell or the gNB that transmits the message, or for a different cell or gNB. For sake of discussion, both FIG. 11 and FIG. 12 concern the second case, i.e., the case in which the information carried by the configuration message includes at least the information about the availability and the delivery method of Other SI SIBs for a cell other than the cell whose access node sent the configuration message. In other words, FIG. 11 shows the configuration message (which may be an implementation of the generic message 2-1 of FIG. 2) as being sent from an unillustrated current serving access node, with the access node 22-2 of FIG. 11 being an access node for a handover or target cell.

FIG. 12 illustrates an exemplary procedure of the third example implementation embodiment and mode, where the wireless terminal 26 in RRC_CONNECTED receives a RRCConnectionReconfiguration message 12-1 that indicates a handover from the current serving cell (controlled by the access node 22-1 (gNB1)) to the target cell (controlled by access node 22-2 (gNB2)). It will be appreciated by the person skilled in the art that, by the time the wireless terminal 26 receives the RRCConnectionReconfiguration message 12-1, the terminal processor 40 will have already established a radio connection with the access node 22-2 and (as mentioned above) has already caused the wireless terminal to enter a connected state, e.g., the RRC_CONNECTED state. Similarly, will be also appreciated by the person skilled in the art that the node processor 30 will have established a radio connection with the wireless terminal, and will have marked the connection state of the wireless terminal as a connected state. The RRCConnectionReconfiguration message 12-1 is also known as a Handover Command, and may be an example implementation of the generic message 2-1 of FIG. 2. The RRCConnectionReconfiguration message 12-1 may also include at least a list of available Other SI SIBs and the delivery method for each of such a SIB to be used in the target cell. The RRCConnectionReconfiguration message 12-1 is handled by the handover unit 78 of wireless terminal 26, which engages in a synchronization procedure 12-2 with the target access node 22-2. The synchronization procedure 12-2 is shown in FIG. 12 as comprising RandomAccessPreamble message 12-2*a* and RandomAccessResponse message 12-2*b*. After synchronizing with the target access node 22-2 (e.g., access node 22-2 (gNB2) in FIG. 12) and sending a RRCConnectionReconfigurationComplete message 12-3, the wireless terminal 26 may select Other SI SIBs for initiating on-demand delivery, and then may send a request message to request the Other system information (Other SI). The UE may use the uplink dedicated resources to send the request message. The request message may take the form of the SystemInformationRequest message 12-4, which includes the identities of the selected SIBs. The SystemInformationRequest message 12-4 may be an example implementation of the generic message 2-2 of FIG. 2. The wireless terminal 26 eventually receives on the downlink dedicated resources a response message, such as SystemInformation message 12-5 of FIG. 12, which comprises, e.g., the content of the requested SIBs. The SystemInformation message 12-5 of FIG. 12 may be an example implementation of the generic message 2-3 of FIG. 2.

It should be noted that the synchronization procedure 12-2 in FIG. 12 may be used for the wireless terminal 26 to synchronize itself to the target access node 22-2(gNB), and is not used for sending a request of on-demand SIB delivery.

FIG. 13 shows an example format of RRCConnectionReconfiguration message 12-1 of FIG. 12. The example format of RRCConnectionReconfiguration message 12-1 includes at least mobilityControlInfo and systemInformationBlockType1Dedicated information elements. The mobilityControlInfo information element may comprise an identification of the target gNB (gNB2) and other radio configuration parameters needed for the handover procedure. In one configuration, the presence of this information element may instruct the UE to perform handover. Meanwhile, systemInformationBlockType1Dedicated information element may contain the SIB1 shown in FIG. 8.

4.0 Fourth Example Implementation Embodiment

Figure 14:
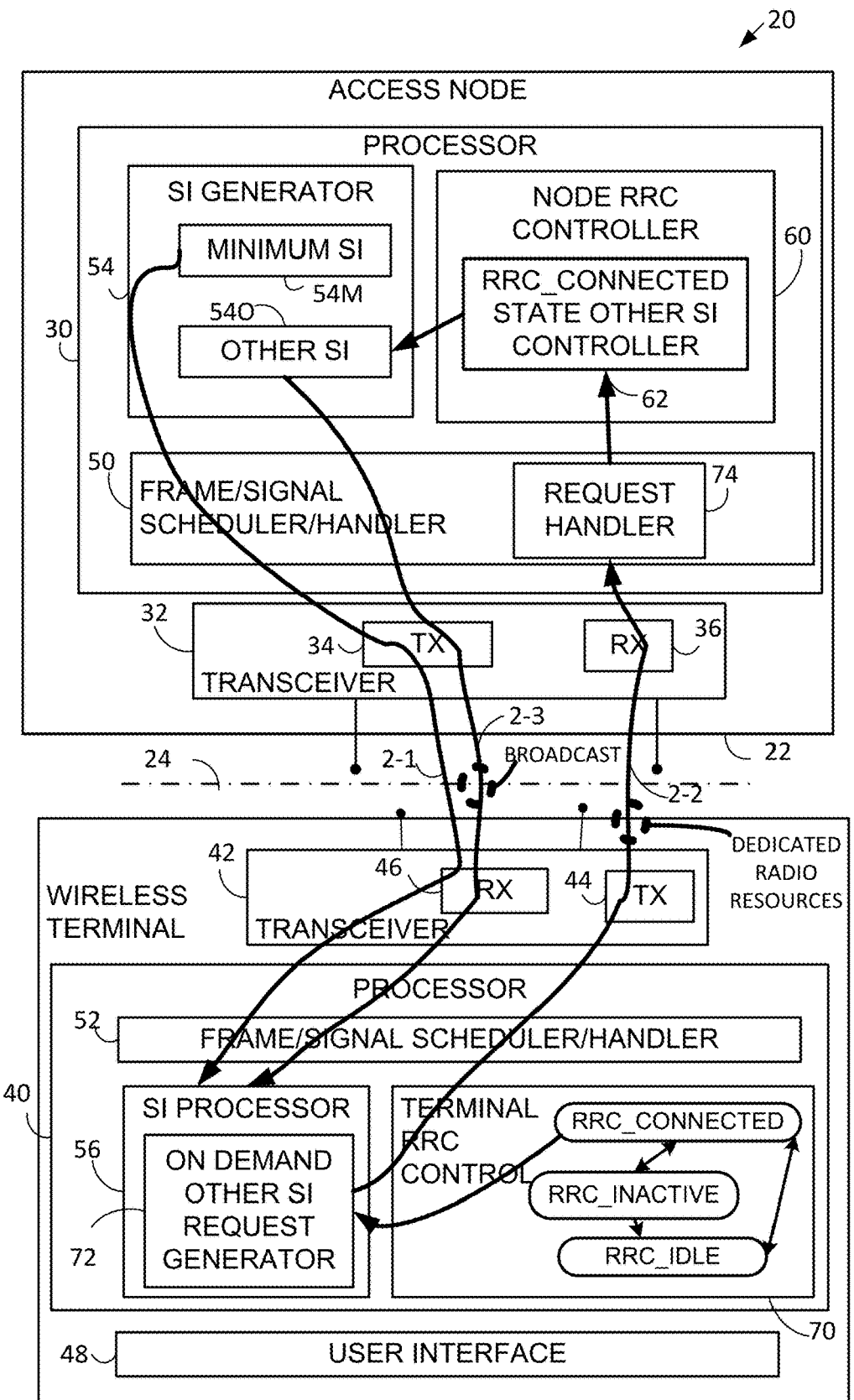
FIG. 14 is a schematic view showing a fourth example implementation example embodiment and mode of a communications system wherein Other system information (Other SI) is requested using dedicated radio resources but delivered by broadcast.

In a fourth example implementation embodiment and mode, the wireless terminal 26 in RRC_CONNECTED state requests on-demand delivery of selected Other SI SIBs using the dedicated uplink resources, but the requested SIBs are delivered by broadcast, using downlink resources configured and scheduled by the serving access node. FIG. 14 shows an example communications system for the second example implementation embodiment and mode. The elements and features of FIG. 14 that are similarly labeled as corresponding elements and features of FIG. 2 have comparable structure and function as previously described. The generic acts of FIG. 3 and FIG. 4 also encompass the acts of the fourth example implementation embodiment and mode.

Figure 15A:
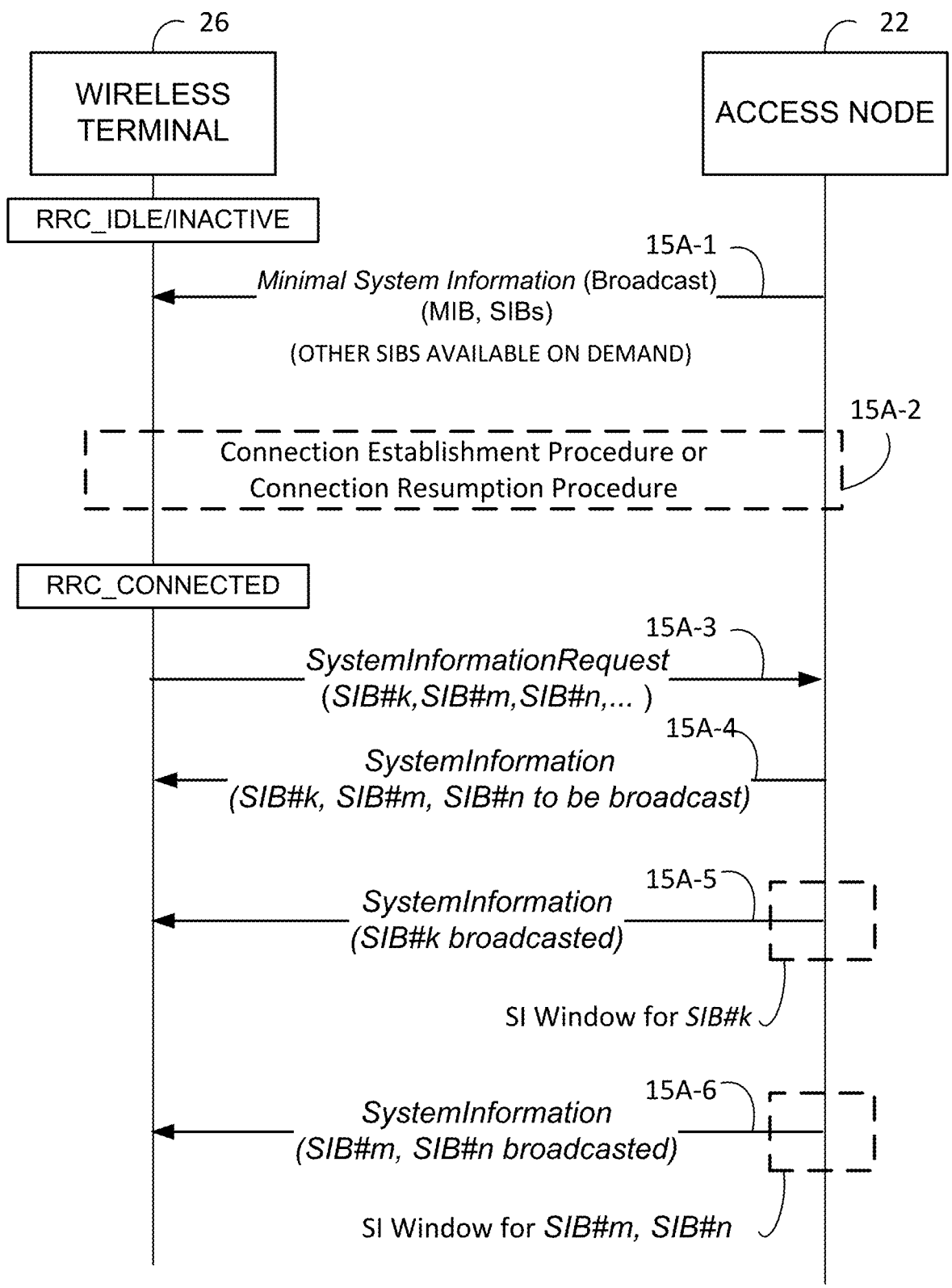
FIG. 15A-FIG. 15C are example signal diagrams showing differing situational variations for the fourth example implementation embodiment and mode.

FIG. 15A shows an example implementation variation of the fourth implementation example embodiment and mode. FIG. 15A particularly shows an example procedure wherein the wireless terminal 26 in RRC_IDLE or RRC_INACTIVE first receives broadcasted Minimum SI in message 15A-1, which is an example implementation of the generic message 2-2 of FIG. 2. The message 15A-1 of FIG. 15A may be a MinimalSystemInformation message which is broadcast by access node 22, and which includes (e.g., in SIB type1), along with the aforementioned SIB availability and the delivery methods, scheduling information of each available SIB, such as the format shown in FIG. 8. The scheduling information of message 15A-1 instructs wireless terminal 26 when to receive the broadcast of SIB of interest. In one configuration, Minimum SI may include a SI window length (e.g. si-WindowLength in FIG. 8) and a list of scheduling information elements (e.g. schedulingInfoList in FIG. 8), each element comprising the periodicity and corresponding SIB types (e.g. si-Periodicity and one or more SIB-Types in FIG. 8). The actual broadcast opportunity (i.e. timing/resources) of a given SIB may be determined by a predetermined or a network-configured formula as a function of at least the corresponding periodicity. At each opportunity the broadcast of the SIB may occur within the duration of the SI window length. More than one SIB may be possibly transmitted on a same opportunity. After receiving the Minimal SI, either a Connection Establishment Procedure or a Connection Resumption Procedure is performed as act 15A-2. The Connection Establishment Procedure or a Connection Resumption Procedure are understood with reference to FIG. 6 and FIG. 7, respectively.

After entering the RRC_CONNECTED state, the wireless terminal 26 may select some of the available on-demand Other SI SIBs and initiate requesting on-demand delivery. In FIG. 15A it is assumed here that the Minimum SI received in RRC_IDLE or RRC_INACTIVE is still valid, although such may not be the case (in which event technology of the second example implementation embodiment and mode is utilized). The wireless terminal 26 may then send SystemInformationRequest message 15A-3 to the access node 22, which includes the identification of the selected SIBs (e.g. SIB # k, SIB # m and SIB # n). The SystemInformationRequest message 15A-3 may be an example implementation of message 2-2 of FIG. 2.

In some configuration of this embodiment, the access node 22 may respond back with an optional message (e.g., SystemInformation message 15A-4) as an acknowledgement of the request, with no contents for the requested SIBs. Alternatively, the access node 22 may not send back a response message at all. In either case, with or without message 15A-4, the UE may then attempt to receive the requested SIBs that will be broadcasted based on the scheduling information. The SystemInformation messages 15A-5 and 15A-6 show scheduled broadcasting of the requested Other system information (Other SI). In particular, SystemInformation message 15A-5 is a broadcast of some of the requested Other system information (Other SI), e.g., SIB # k, while SystemInformation message 15A-6 is a broadcast of other SIBs of the requested Other system information (Other SI), e.g., SIB # m and SIB # n. FIG. 15A further shows that there is a separate window for broadcast of each of the messages 15A-5 and 15A-6.

Figure 15B:
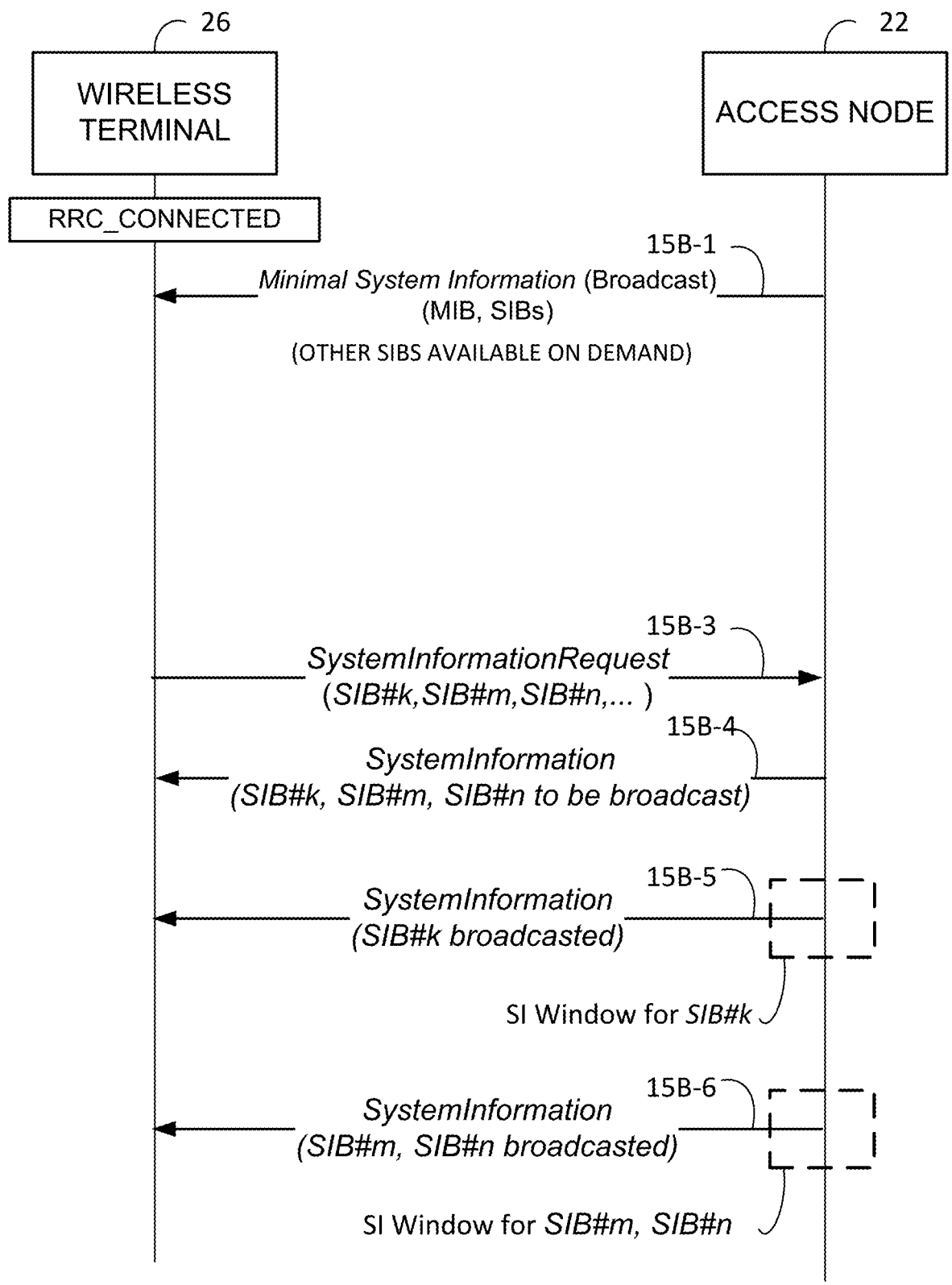

FIG. 15B is essentially the same procedure as FIG. 15A, but differs in that in the procedure of FIG. 15B the wireless terminal 26 acquires Minimum SI during RRC_CONNECTED state.

Figure 15C:
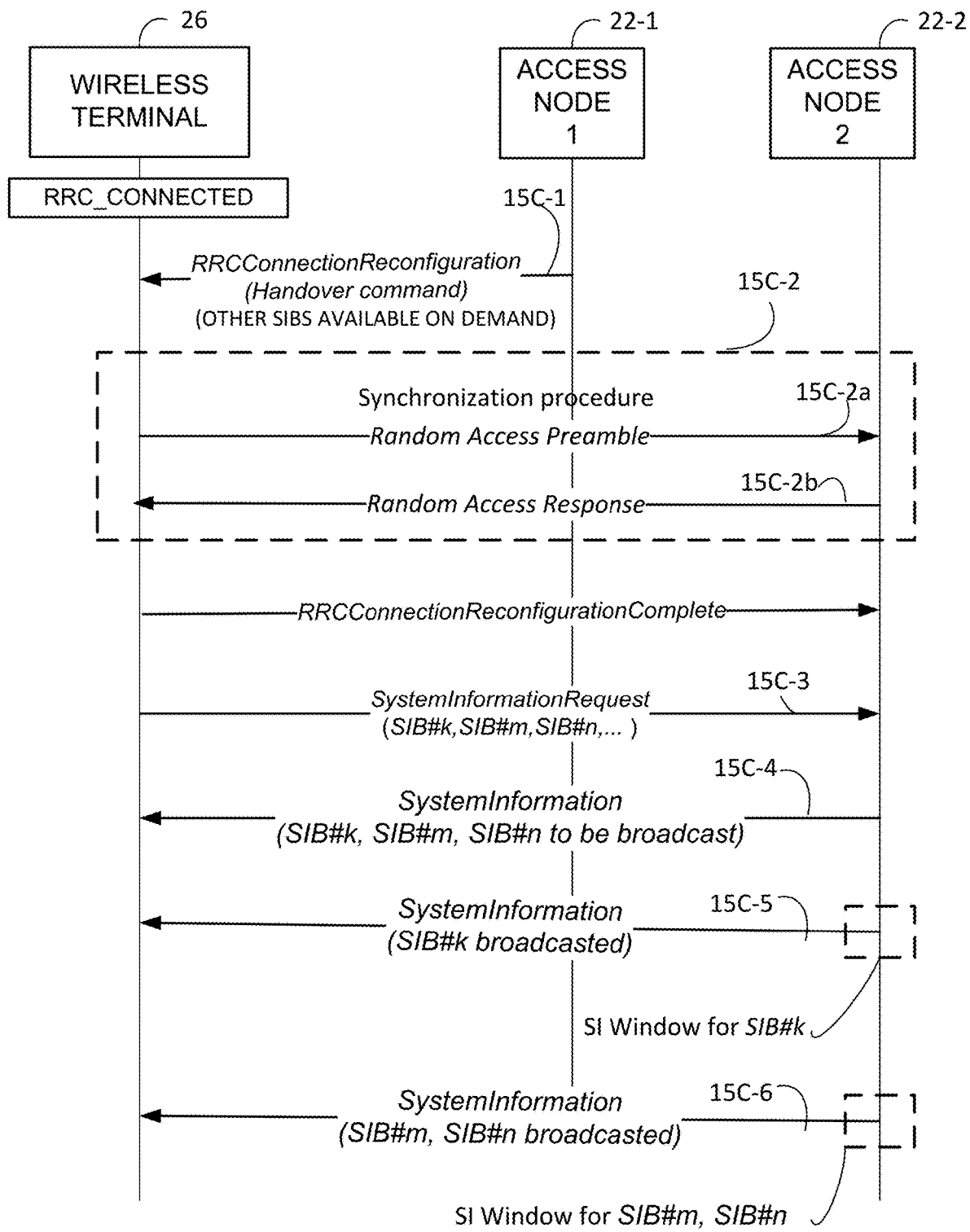

FIG. 15C shows an example case where the wireless terminal 26 receives the SIB availability information and the scheduling information via a message using downlink dedicated resources. In FIG. 15C, the wireless terminal 26 receives such information via RRCConnectionReconfiguration message 15C-1, which indicates a handover to the target cell/gNB, e.g., to access node 22-2.

In each of the situational variations of FIG. 15A, FIG. 15B, and FIG. 15C, the wireless terminal 26 makes a request for Other system information (Other SI) using dedicated resource messages such as 15A-3, 15B-3, and 15C-3, respectively. These messages 15A-3, 15B-3, and 15C-3 are implementation examples of the generic message 2-2 of FIG. 2. Moreover, the wireless terminal 26 of each of FIG. 15A, FIG. 15B, and FIG. 15C, receive the requested Other system information (Other SI) by broadcast from an appropriate node (access node 22 in the cases of FIG. 15A and FIG. 15B, and access node 22-2 in the case of FIG. 15C). The broadcast messages (15A-5 and 15A-6 in FIG. 15A, 15B-5 and 15B-6 in FIG. 15B, and 15C-5 and 15C-6 in FIG. 15C) may correspond to the generic message 2-3 of FIG. 2.

5.0 Fifth Example Implementation Embodiment

Figure 16:
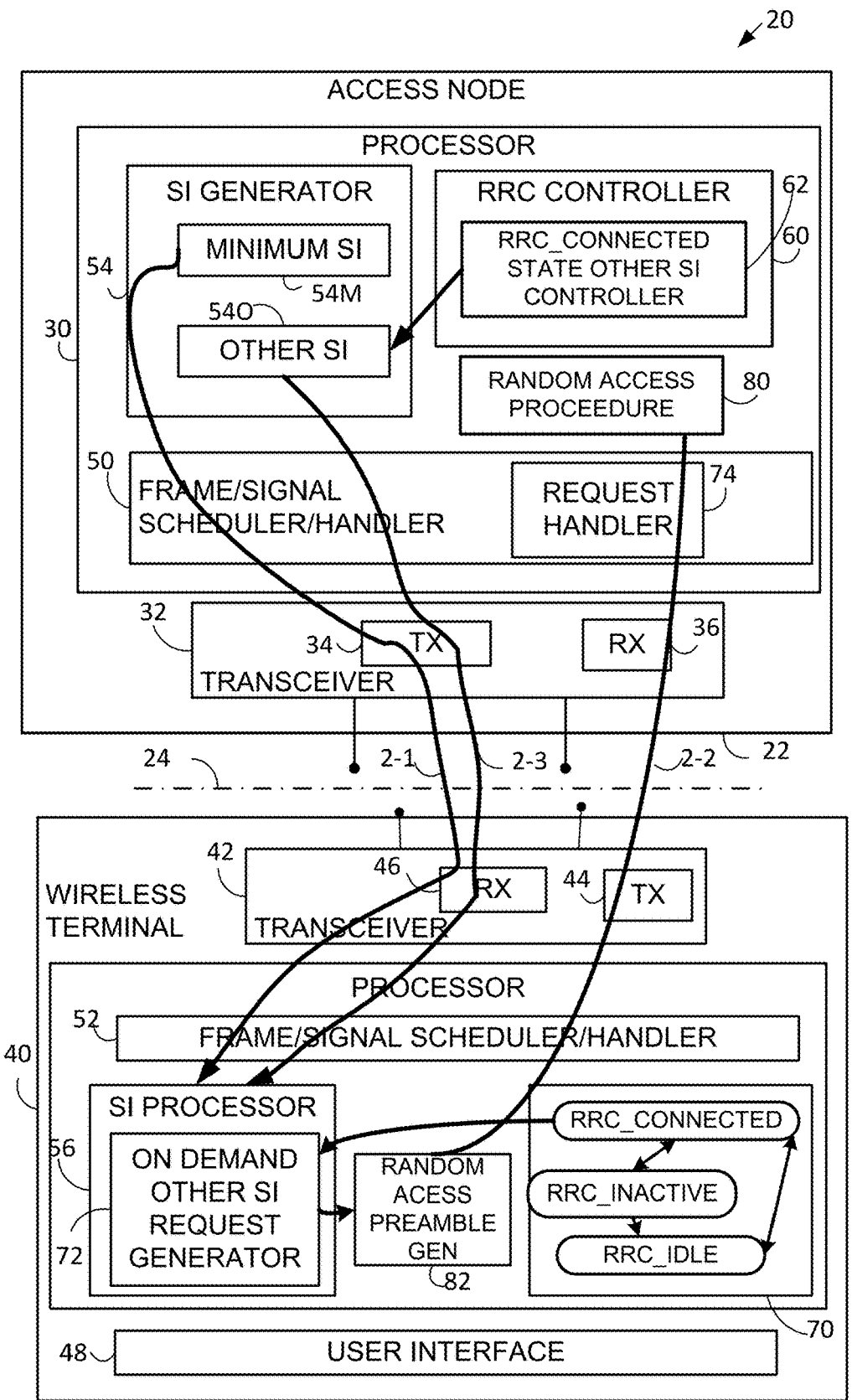
FIG. 16 is a schematic view showing a fifth example implementation example embodiment and mode of a communications system wherein Other system information (Other SI) is requested using random access preamble index.

In a fifth example implementation embodiment and mode, the Other system information (Other SI) SIB(s) is requested based on information (e.g., a random access preamble index) included in a random access preamble. FIG. 16 shows an example communications system for the fifth example implementation embodiment and mode. The elements and features of FIG. 16 that are similarly labeled as corresponding elements and features of FIG. 2 have comparable structure and function as previously described. FIG. 16 further shows that the access node 22 includes random access procedure 80. The terminal processor 40 of wireless terminal 26 has a similar random access procedure, comprising random access preamble generator 82 shown in FIG. 16. The generic acts of FIG. 3 and FIG. 4 also encompass the acts of the second example implementation embodiment and mode.

In the fifth example implementation embodiment and mode, the request of on-demand delivery for Other SI SIBs may be accomplished by the wireless terminal 26 in RRC_CONNECTED sending a Random Access Preamble, which may comprise a sequence selected from a set of available sequences configured by the access node via Minimum SI. A given sequence is identified by Preamble Index. When the access node detects the transmission of a preamble sequence, it may respond to it with Random Access Response, which includes the Preamble Index corresponding to the sequence.

Figure 17:
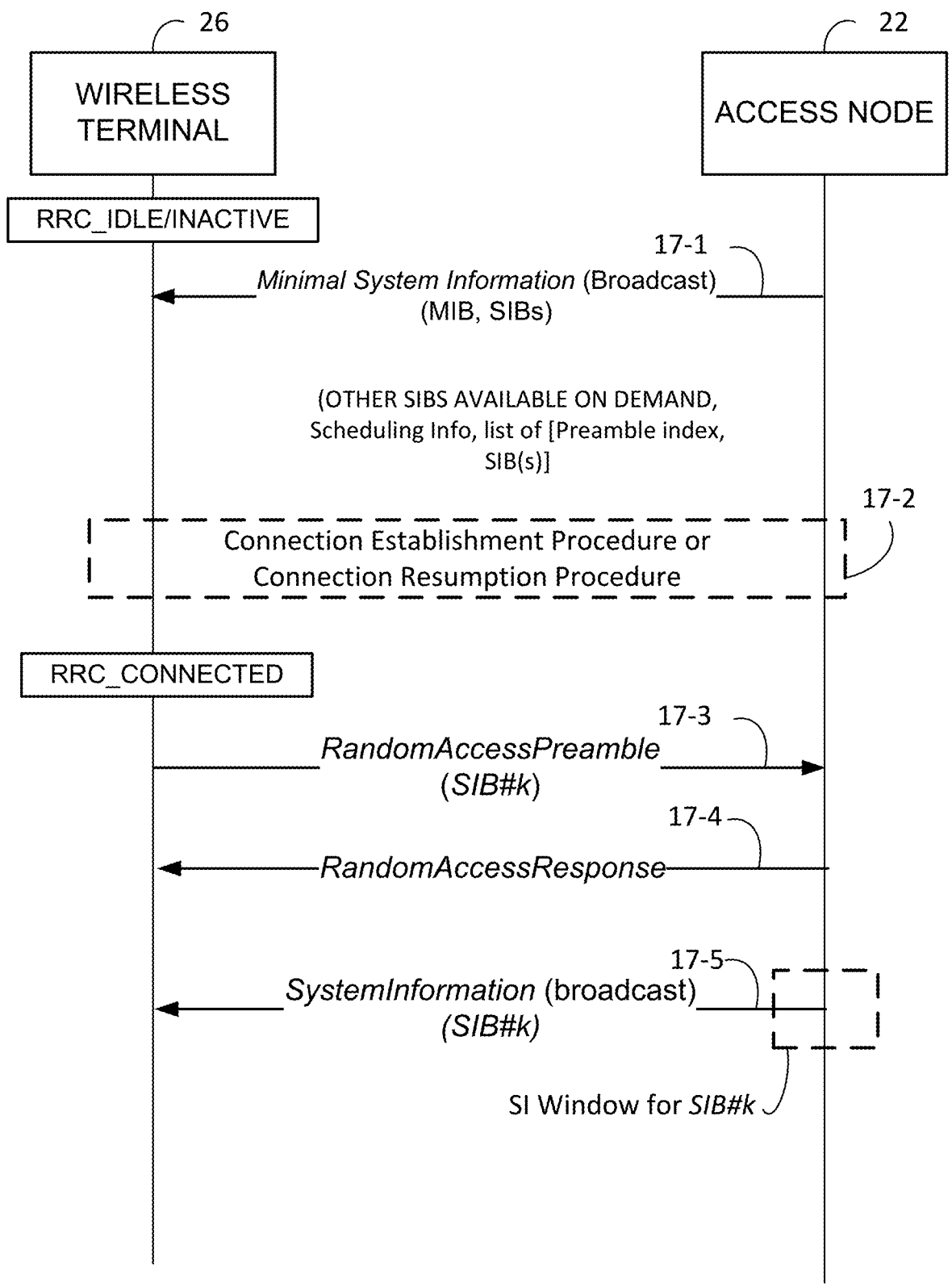
FIG. 17 is an example signal diagram for the fifth example implementation embodiment and mode.

In one configuration, the access node may include in Minimum SI (e.g. in SIB Type 2) a set of Preamble indices, each of which is designated for requesting on-demand delivery of one or more specific Other SI SIBs. FIG. 17 illustrates an example flow using this configuration, where the wireless terminal 26 in RRC_IDLE or RRC_INACTIVE by message 17-1 receives Minimum SI that includes available SIBs and delivery methods, scheduling information of SIBs, and a list of [Preamble index, associated SIB(s)]. FIG. 17 shows performance of either a Connection Establishment Procedure or Connection Resumption Procedure by act 17-2, which are understood with reference to FIG. 6 and FIG. 7, respectively.

In the RRC_CONNECTED state (assuming that the Minimum SI is still valid), the wireless terminal 26 may transmit Random Access Preamble sequence given by the Preamble Index associated with the SIB(s) that the UE has selected. The transmission of the Random Access Preamble is depicted by message 17-3 of FIG. 17, which may be an implementation of the generic message 2-2 of FIG. 2. When the wireless terminal 26 receives a Random Access Response message (depicted by message 17-4 in FIG. 17), which includes the Preamble Index, the wireless terminal 26 may then attempt to receive the SystemInformation message 17-5 which includes the content of the requested SIB(s), broadcasted on the aforementioned opportunities with SI window length. In the FIG. 17 scenario, the SystemInformation message 17-5 carries the Other system information (Other SI) for SIB # k, and is scheduled in the SI window length associated with SIB # k. The SystemInformation message 17-5 corresponds to the generic message 2-3 of FIG. 2.

Similar to the fourth embodiment, the wireless terminal 26 may acquire Minimum SI during RRC_CONNECTED and utilize the information to initiate Random Access Preamble transmission for requesting on-demand delivery of Other SI SIBs. The procedure is identical to the one shown in FIG. 17, except that Minimum SI acquisition is performed during RRC_CONNECTED. Likewise, the wireless terminal 26 may obtain the necessary information (available SIBs and delivery methods, scheduling information of SIBs, and a list of [Preamble index, associated SIB(s)]) by a dedicated signaling message (such as RRCConnectionReconfiguration) during RRC_CONNECTED.

6.0 Sixth Example Implementation Embodiment

Figure 18:
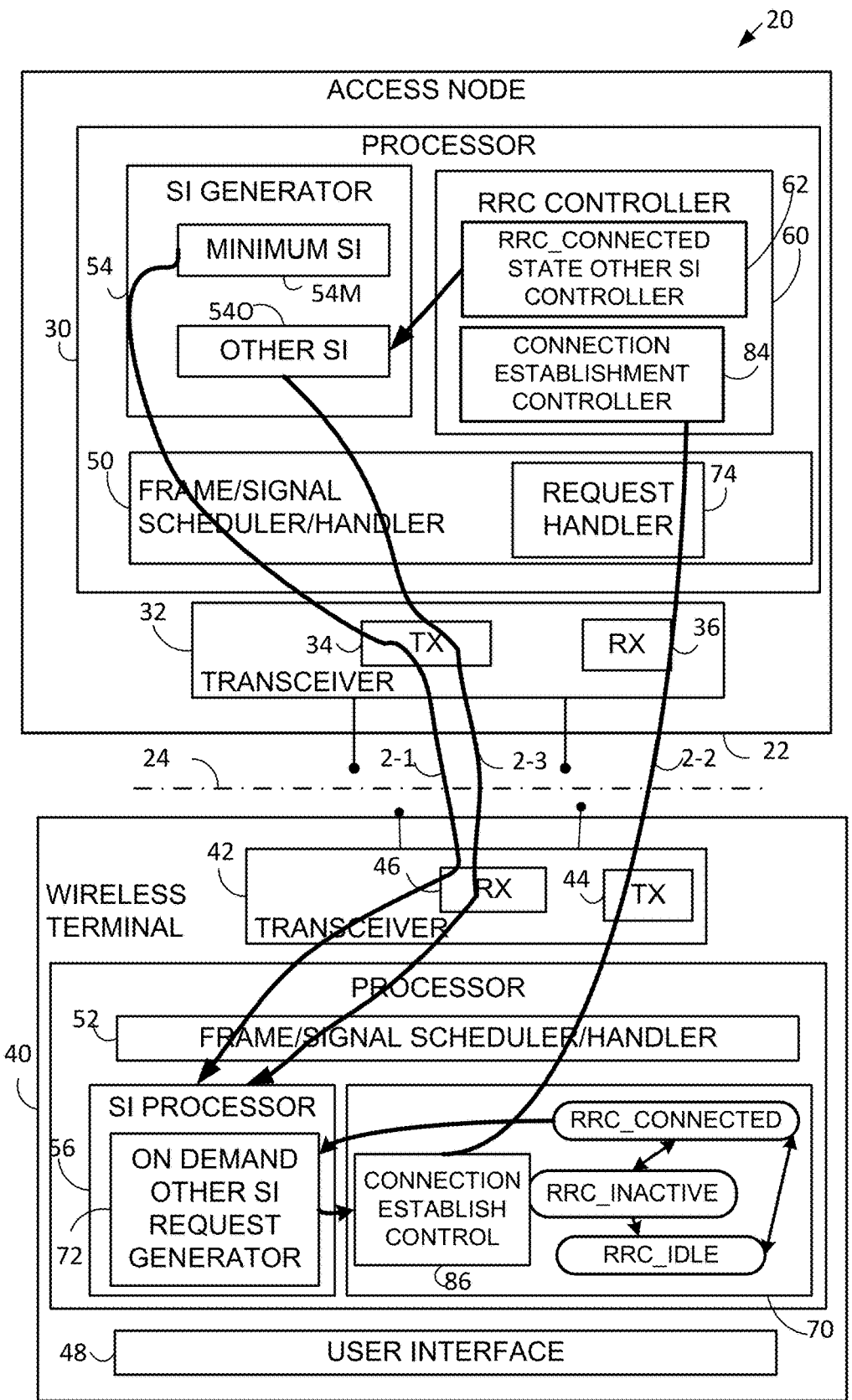
FIG. 18 is a schematic view showing a sixth example implementation example embodiment and mode of a communications system wherein Other system information (Other SI) is requested using certain signal "piggybacking" techniques.

In a sixth example implementation embodiment and mode, the Other system information (Other SI) SIB(s) is requested using certain "piggybacking" techniques wherein the request for Other system information (Other SI) is included in or concatenated with another signaling message, such as a message of a Connection Establishment Procedure. The signaling message may be or comprise, for example, a RRCConnectionSetupComplete message, a RRCResumeComplete message, or a RRCConnectionReconfigurationComplete message. FIG. 18 shows an example communications system for the sixth example implementation embodiment and mode. The elements and features of FIG. 18 that are similarly labeled as corresponding elements and features of FIG. 2 have comparable structure and function as previously described. FIG. 18 further shows that the access node 22 includes connection establishment controller 84, preferably but not necessarily exclusively performed by node RRC controller 60. The terminal RRC controller 70 of wireless terminal 26 has a similar connection establishment controller 86. The generic acts of FIG. 3 and FIG. 4 also encompass the acts of the second example implementation embodiment and mode.

Figure 19:
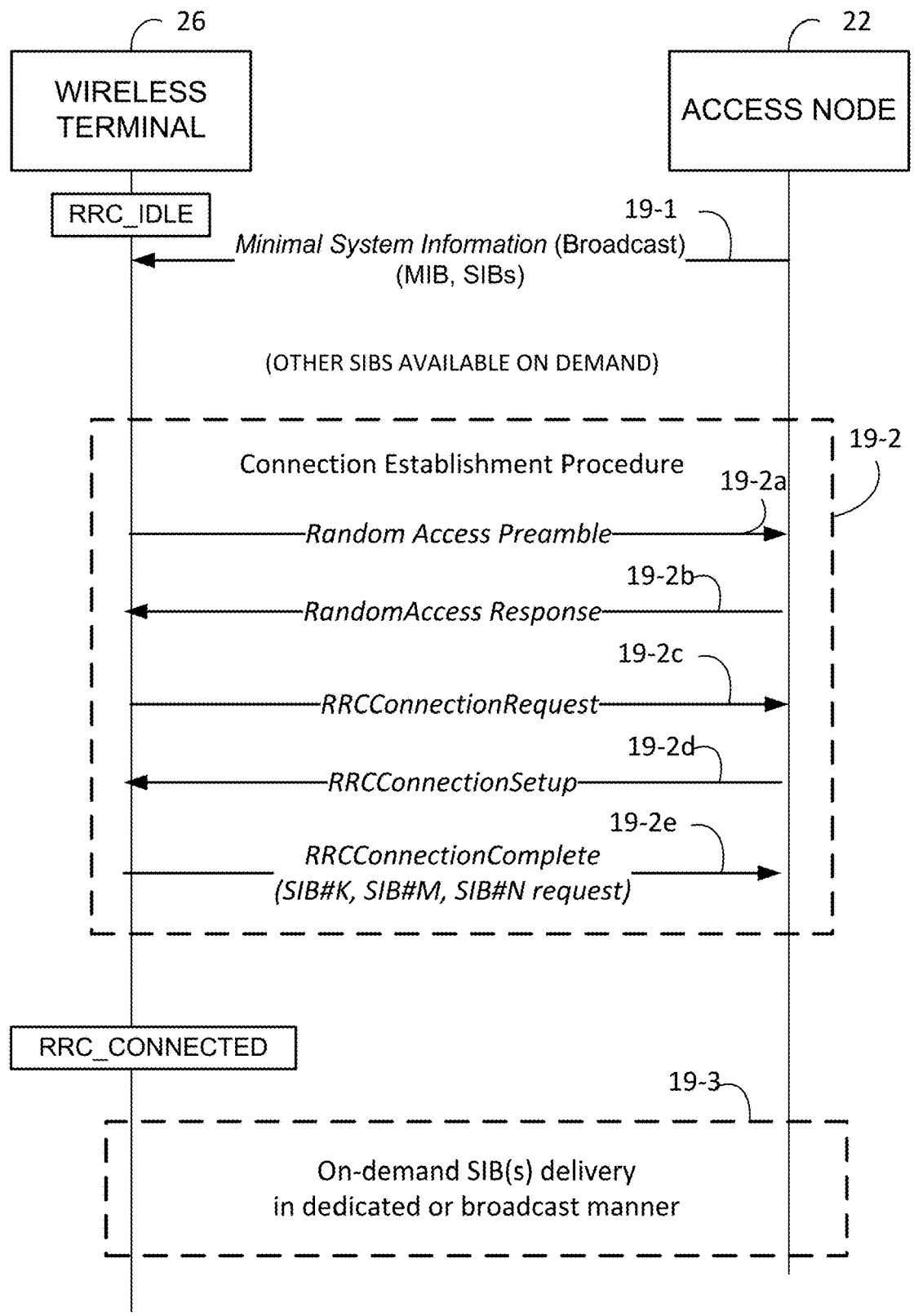
FIG. 19 is an example signal diagram for sixth fifth example implementation embodiment and mode.

Thus, the sixth embodiment allows the UE to send SystemInformationRequest by piggybacking, such as by piggyback on a message of Connection Establishment Procedure 19-2 of FIG. 19. The Connection Establishment Procedure 19-2 of FIG. 19 comprises RandomAccessPreamble message 19-2a, AccessResponse message 19-2b, RRCConnectionRequest message 19-2c, RRCConnectionSetup message 19-2d, and RRCConnectionComplete message 19-2e. For example, as shown by the signal diagram of FIG. 19, when the wireless terminal 26 in RRC_IDLE attempts to establish the connection, the wireless terminal 26 may include in one of the messages for the connection establishment procedure 19-2 (such as RRCConnectionSetupComplete message 19-2d) an information element to indicate a request of on-demand delivery for some Other SI SIBs. The choice of messages for piggybacking, e.g., to bear the request for the Other system information (Other SI), is not limited to any particular one or combination of messages comprising the Connection Establishment Procedure, and indeed may be other messages of other signaling procedures as well.

In RRC_CONNECTED, the access node 22 (e.g., gNB) may deliver the requested SIBs in the dedicated manner as described in the first implementation embodiment and mode, or by the broadcast manner as disclosed in the fourth implementation embodiment and mode, all of which are represented by delivery procedure 19-3 of FIG. 19, and which correspond to the generic message 2-3 of FIG. 2.

Similarly, the wireless terminal 26 may include the aforementioned information element for on-demand SIB request in RRCConnectionReconfigurationComplete during the handover process. Likewise, the requested SIBs may be delivered in either a dedicated or broadcast manner.

7.0 Seventh Example Implementation Embodiment

The first to third example implementation embodiments and modes involve a procedure of the wireless terminal in RRC_CONNECTED sending a request for on-demand Other SI SIB(s) delivery and receiving the contents of the requested SIB(s) using uplink and downlink dedicated resources, respectively. In the fourth example implementation embodiment and mode, on the other hand, the wireless terminal sends the request in a dedicated manner, but receives the requested SIBs by broadcast. Furthermore, in the fifth example implementation embodiment and mode the wireless terminal sends the request via Random Access Preamble. This seventh example implementation embodiment and mode is aimed to provide methods and procedure for the radio access network to configure the UE for selecting among plural possible request/delivery methods, including those of the first through sixth example implementation embodiments and modes.

Figure 20:
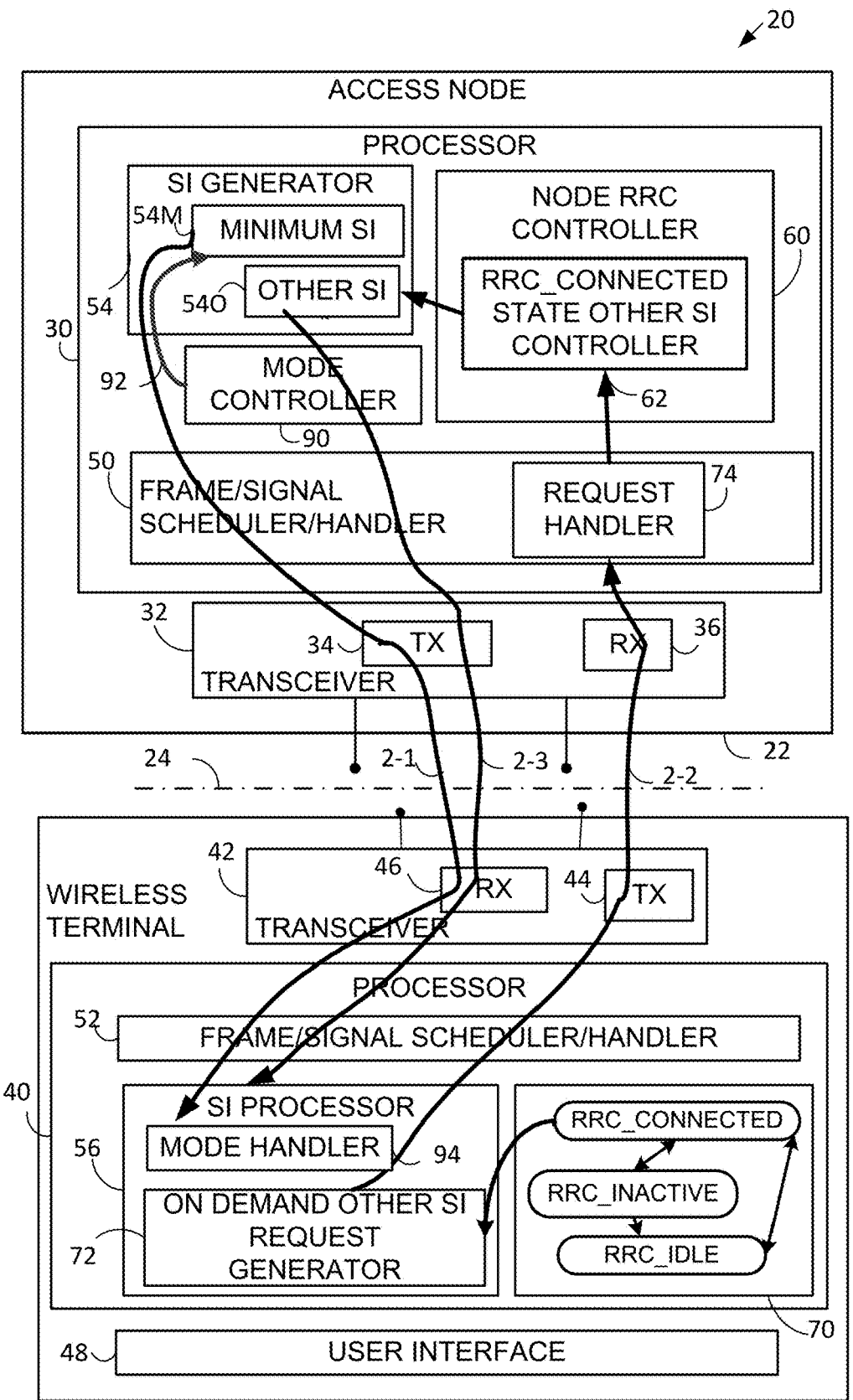
FIG. 20 is a schematic view showing a sixth example implementation example embodiment and mode of a communications system wherein the wireless terminal is provided with an indication 92 of specified Other SIB mode request/delivery mode, which may select among plural possible request/delivery modes.

FIG. 20 shows an example communications system for the seventh example implementation embodiment and mode. The elements and features of FIG. 20 that are similarly labeled as corresponding elements and features of FIG. 2 have comparable structure and function as previously described. FIG. 20 further shows that the access node 22 includes Other SIB mode request/delivery controller 90. The Other SIB mode request/delivery controller 90 is configured essentially to generate an indication of which one of plural Other SIB mode request/delivery modes in which the wireless terminal 26 is requested to operate. As understood with reference to the preceding example implementation embodiment and modes, the plural Other SIB mode request/delivery modes include two or more the following:
- requesting the second type SIB using dedicated uplink resources and receiving the second type SIB using dedicated downlink resources
- requesting the second type SIB using dedicated uplink resources and receiving the second type SIB by broadcast
- requesting the second type SIB using a random access preamble dedicated uplink resources and receiving the second type SIB by broadcast FIG. 20 shows the Other SIB mode request/delivery controller 90 as generating the indication 92 of specified Other SIB mode request/delivery mode, and communicating the indication 92 of specified Other SIB mode request/delivery mode to wireless terminal 26. The wireless terminal 26, and terminal processor 40 in particular, comprises an Other SIB mode request/delivery mode indicator handler 94, which interprets the indication 92 of specified Other SIB mode request/delivery mode and governs the Other system information (Other SI) requesting and receiving operations accordingly.

In one example configuration, the access node may include a set of instructions or indications in broadcasted Minimum SI. Specifically, Minimum SI (e.g. in SIB1) may include an information element which includes the indication 92 of specified Other SIB mode request/delivery mode in which the wireless terminal 26 is requested to operate. The information element of Table 1 shows how the wireless terminal may be configured with the request/delivery method (e.g., the indication 92 of specified Other SIB mode request/delivery mode), such as dedicated for request/delivery, dedicated for request then broadcast for delivery, or use Random Access Preamble/Response for request then broadcast for delivery.

TABLE 1

```
-- ASN1START
OnDemandSibConfigDedicated ::=     SEQUENCE {
    reqDeliveryConfig              ENUMERATED {dedicated,
dedicated-broadcast, RACH-broadcast, spare}
}
-- ASN1STOP
```

The above example does not limit other forms of possible implementation, such as a bit map. This information element (e.g., indication 92 of specified Other SIB mode request/delivery mode) may be also included in a downlink dedicated signaling message, such as RRCConnectionReconfiguration.

Figure 21:
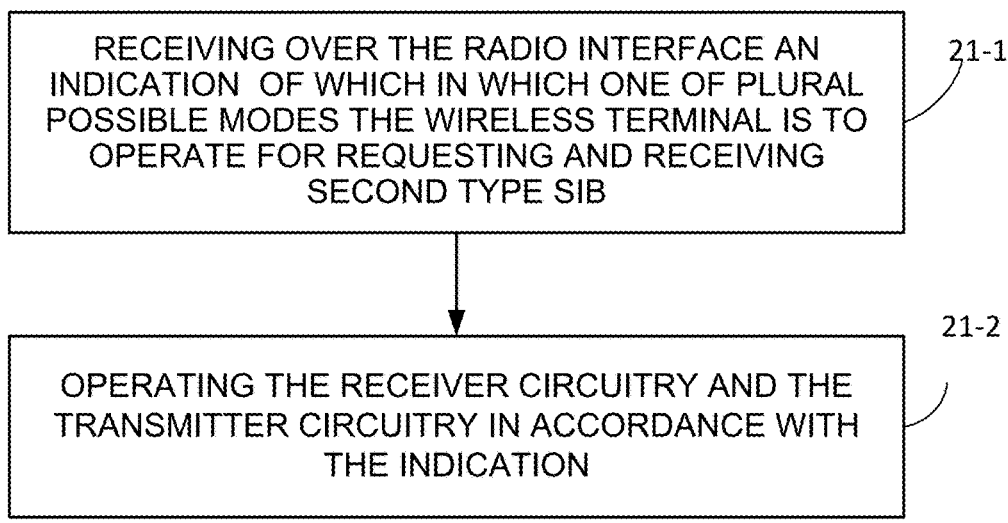
FIG. 21 is a flowchart showing example, basic example acts or steps performed by a wireless terminal of the seventh example implementation embodiment and mode.

FIG. 21 illustrates example acts or steps performed by wireless terminal 26 in conjunction with the seventh example implementation embodiment and mode. Act 21-1 comprises the wireless terminal receiving over the radio interface an indication (e.g., indication 92 of specified Other SIB mode request/delivery mode) of which in which one of plural possible modes the wireless terminal is to operate for requesting and receiving second type SIB. As mentioned above, the plural possible modes including at least two of: (1) requesting the second type SIB using dedicated uplink resources and receiving the second type SIB using dedicated downlink resources; (2) requesting the second type SIB using dedicated uplink resources and receiving the second type SIB by broadcast; and (3) requesting the second type SIB using a random access preamble dedicated uplink resources and receiving the second type SIB by broadcast. Act 21-2 comprises the wireless terminal operating the receiver circuitry and the transmitter circuitry in accordance with the indication, e.g., in order to send the request message 2-2 and to receive the response message 2-3 in accordance with the mode specified by the indication 92 of specified Other SIB mode request/delivery mode.

In another configuration, the request/delivery method may be pre-determined in some operational conditions. For example, some cells/gNBs may not possess resources for broadcast or the Random Access procedure, such as a cells used as Secondary Cell (SCell) in Dual Connectivity. In this case, when there is a need for the UE to receive some on-demand Other SI SIBs from the SCell, the UE may use the dedicated signaling for request and delivery by default.

Figure 22:
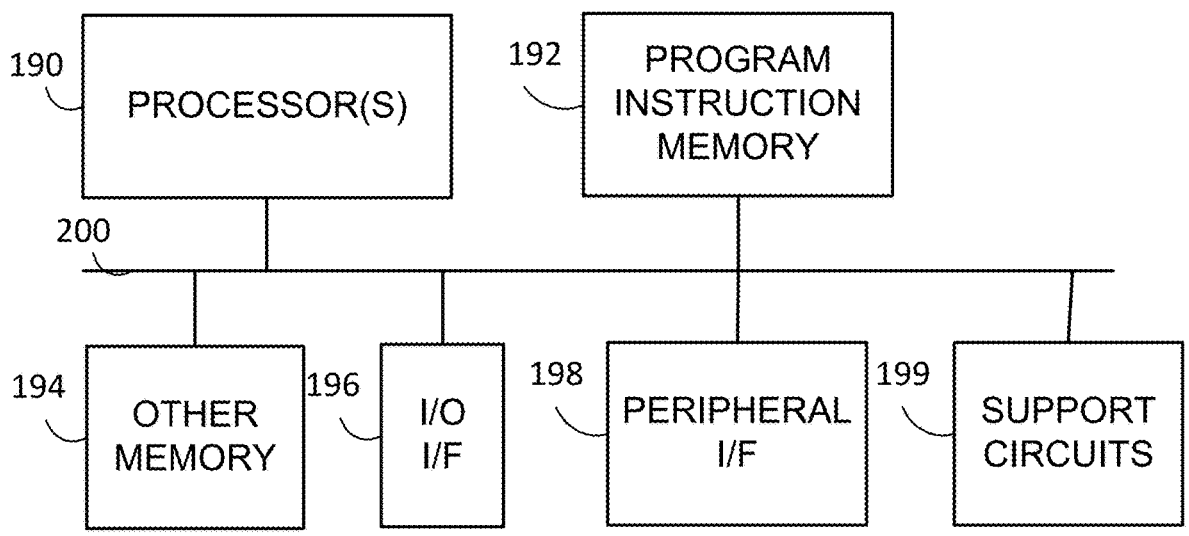
FIG. 22 is a diagrammatic view showing example electronic machinery which may comprise node electronic machinery or terminal electronic machinery.

Certain units and functionalities of node 22 and wireless terminal 26 are, in example embodiments, implemented by electronic machinery, computer, and/or circuitry. For example, the node processors 30 and terminal processors 40 of the example embodiments herein described and/or encompassed may be comprised by the computer circuitry of FIG. 22. FIG. 22 shows an example of such electronic machinery or circuitry, whether node or terminal, as comprising one or more processor(s) circuits 190, program instruction memory 192; other memory 194 (e.g., RAM, cache, etc.); input/output interfaces 196; peripheral interfaces 198; support circuits 199; and busses 200 for communication between the aforementioned units.

The program instruction memory 192 may comprise coded instructions which, when executed by the processor(s), perform acts including but not limited to those described herein. Thus is understood that each of node processor 30 and terminal processor 40, for example, comprise memory in which non-transient instructions are stored for execution.

The memory 194, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 199 are coupled to the processors 190 for supporting the processor in a conventional manner. These circuits include cache, power supplies, clock circuits, input/output circuitry and subsystems, and the like.

The technology of this application thus encompasses but is not limited to the following example embodiments, example features, and example advantages:

Example Embodiment 1

A wireless terminal which communicates over a radio interface with access nodes of a radio access network (RAN), the wireless terminal comprising:
receiver circuitry configured to receive first type system information over the radio interface, the first type system information including availability of a second type system information block (SIB) and an indication of a delivery mode for the available second type SIB, the delivery mode being either periodic broadcast or on-demand basis;
processor circuitry configured to:
establish a radio connection;
cause the wireless terminal to enter a connected state;
generate a request message to request the second type SIB available on-demand basis;
transmitter circuitry configured to transmit the request message over the radio interface while in the connected state;
wherein the receiver circuitry is further configured to receive the second type SIB while in the connected state.

Example Embodiment 2

The wireless terminal of claim 1, wherein the receiver circuitry is configured to receive the first type system information and the second type SIB over the radio interface from a same access node.

Example Embodiment 3

The wireless terminal of example embodiment 1, wherein the receiver circuitry is configured to receive the first type system information over the radio interface from a first access node and to receive the second type SIB over the radio interface from a second access node.

Example Embodiment 4

The wireless terminal of example embodiment 1, wherein:
the first type system information including availability of plural second type system information blocks (SIBs) and an indication of a delivery mode for the available plural second type SIBs,
wherein the processor circuitry configured to generate the request message to request the plural second type SIBs available on-demand basis; and,
wherein the receiver circuitry is further configured to receive the plural second type SIBs while in the connected state.

Example Embodiment 5

The wireless terminal of example embodiment 1, wherein the wireless terminal receives the first type system information as a periodic broadcast.

Example Embodiment 6

The wireless terminal of example embodiment 5, wherein the first type system information is received while the wireless terminal is in a non-connected state.

Example Embodiment 7

The wireless terminal of example embodiment 5, wherein the first type system information is received while the wireless terminal is in the connected state.

Example Embodiment 8

The wireless terminal of example embodiment 1, wherein the wireless terminal is configured to use the first type system information if the first type system information is valid.

Example Embodiment 9

The wireless terminal of example embodiment 1, wherein the wireless terminal is configured to receive the first type system information transmitted on dedicated downlink resources while in the connected state.

Example Embodiment 10

The wireless terminal of example embodiment 1, wherein the wireless terminal is configured to transmit the request message on dedicated uplink resources.

Example Embodiment 11

The wireless terminal of example embodiment 10, wherein the wireless terminal is further configured to attempt to receive the requested second type SIB on dedicated downlink resources.

Example Embodiment 12

The wireless terminal of example embodiment 10, wherein the wireless terminal is further configured to attempt to receive the requested second type SIB transmitted by broadcast.

Example Embodiment 13

The wireless terminal of example embodiment 12, wherein the first type system information includes scheduling information for broadcast of the available second type SIB, which is utilized for reception of the requested second type SIB.

Example Embodiment 14

The wireless terminal of example embodiment 1, wherein the request message comprises a random access preamble sequence designated for one or more second type SIBs selected for the request message.

Example Embodiment 15

The wireless terminal of example embodiment 14, wherein the wireless terminal is further configured to receive from the second access node a random access response as an acknowledgement of the random access preamble sequence.

Example Embodiment 16

The wireless terminal of example embodiment 14, wherein the wireless terminal is further configured to attempt to receive the broadcasted second type SIB.

Example Embodiment 17

The wireless terminal of example embodiment 16, wherein the first type system information includes scheduling information for broadcast of the available second type SIB, and the wireless terminal configured to utilize the scheduling information for reception of the requested second type SIB.

Example Embodiment 18

The wireless terminal of example embodiment 1, wherein the request message is included or concatenated with another signaling message.

Example Embodiment 19

The wireless terminal of example embodiment 18, wherein the another signaling message comprises a message of a connection establishment procedure.

Example Embodiment 20

The wireless terminal of example embodiment 18, wherein the another signaling message comprises a RRC-ConnectionSetupComplete message, RRCResumeComplete message, or a RRCConnectionReconfigurationComplete message.

Example Embodiment 21

The wireless terminal of example embodiment 1, wherein a means of sending the request message and/or a means of receiving the requested second type SIB are pre-determined, the means of sending the request message being either dedicated signaling or random access preamble sequence, the means of receiving the requested second type SIB being either broadcast or dedicated signaling.

Example Embodiment 22

The wireless terminal of example embodiment 1, wherein the receiver circuitry is configured to receive over the radio interface an indication of which in which one of plural possible modes the wireless terminal is to operate for requesting and receiving second type SIB, the plural possible modes including at least two of:
  requesting the second type SIB using dedicated uplink resources and receiving the second type SIB using dedicated downlink resources;
  requesting the second type SIB using dedicated uplink resources and receiving the second type SIB by broadcast;
  requesting the second type SIB using a random access preamble dedicated uplink resources and receiving the second type SIB by broadcast; and
wherein the processor circuitry is configured to operate the receiver circuitry and the transmitter circuitry in accordance with the indication.

Example Embodiment 23

The wireless terminal of example embodiment 22, wherein the receiver circuitry is configured to receive the indication in the first type system information.

Example Embodiment 24

The wireless terminal of example embodiment 1, wherein a means of sending the request message and/or a means of receiving the requested second type SIB are specified in the first type system information.

Example Embodiment 25

A method in a wireless terminal which communicates over a radio interface with an access node of a radio access network (RAN), the method comprising:
  receiving first type system information over the radio interface, the first type system information including availability of a second type system information block (SIB) and an indication of a delivery mode for the available second type SIB, the delivery mode being either periodic broadcast or on-demand basis;
  establishing a radio connection;
  entering a connected state;
  generating a request message to request the second type SIB available on-demand basis;
  transmitting the request message over the radio interface while in the connected state;
  receiving the second type SIB while in the connected state.

Example Embodiment 26

The method of example embodiment 25, further comprising receiving the first type system information and the second type SIB over the radio interface from a same access node.

Example Embodiment 27

The method of example embodiment 25, further comprising receiving the first type system information over the radio interface from a first access node and receiving the second type SIB over the radio interface from a second access node.

Example Embodiment 28

The method of example embodiment 25, wherein the first type system information including availability of plural second type system information blocks (SIBs) and an indication of a delivery mode for the available plural second type SIBs, and wherein the method further comprises:
  generating the request message to request the plural second type SIBs available on-demand basis; and, receiving the plural second type SIBs while in the connected state.

Example Embodiment 29

The method of example embodiment 25, further comprising receiving the first type system information by periodic broadcast.

Example Embodiment 30

The method of example embodiment 29, further comprising receiving the first type system information while the wireless terminal is in a non-connected state.

Example Embodiment 31

The method of example embodiment 29, further comprising receiving the first type system information while the wireless terminal is in the connected state.

Example Embodiment 32

The method of example embodiment 29, further comprising the wireless terminal using the first type system information if the first type system information is valid.

Example Embodiment 33

The method of example embodiment 29, further comprising receiving the first type system information on dedicated downlink resources while in the connected state.

Example Embodiment 34

The method of example embodiment 25, further comprising transmitting the request message on dedicated uplink resources.

Example Embodiment 35

The method of example embodiment 34, further comprising attempting to receive the requested second type SIB on dedicated downlink resources.

Example Embodiment 36

The method of example embodiment 34, further comprising attempting to receive the requested second type SIB transmitted by broadcast.

Example Embodiment 37

The method of example embodiment 36, wherein the first type system information includes scheduling information for broadcast of the available second type SIB, which is utilized for reception of the requested second type SIB.

Example Embodiment 38

The method of example embodiment 25, further comprising configuring the request message to comprise a random access preamble sequence designated for one or more second type SIBs selected for the request message.

Example Embodiment 39

The method of example embodiment 38, further comprising receiving from the second access node a random access response as an acknowledgement of the random access preamble sequence.

Example Embodiment 40

The method of example embodiment 38, further comprising attempting to receive the broadcasted second type SIB.

Example Embodiment 41

The method of example embodiment 40, wherein the first type system information includes scheduling information for broadcast of the available second type SIB, which is utilized for reception of the requested second type SIB.

Example Embodiment 42

The method of example embodiment 25, further comprising configuring the request message to be included or concatenated with another signaling message.

Example Embodiment 43

The method of example embodiment 42, wherein the another signaling message comprises a message of a connection establishment procedure.

Example Embodiment 44

The method of example embodiment 42, wherein the another signaling message comprises a RRCConnectionSetupComplete message, a RRCResumeComplete message, or a RRCConnectionReconfigurationComplete message.

Example Embodiment 45

The method of example embodiment 25, wherein a means of sending the request message and/or a means of receiving the requested second type SIB are pre-determined, the means of sending the request message being either dedicated signaling or random access preamble sequence, the means of receiving the requested second type SIB being either broadcast or dedicated signaling.

Example Embodiment 46

The method of example embodiment 25, further comprising:
  receiving over the radio interface an indication of which in which one of plural possible modes the wireless terminal is to operate for requesting and receiving second type SIB, the plural possible modes including at least two of:
    requesting the second type SIB using dedicated uplink resources and receiving the second type SIB using dedicated downlink resources;
    requesting the second type SIB using dedicated uplink resources and receiving the second type SIB by broadcast;

requesting the second type SIB using a random access preamble dedicated uplink resources and receiving the second type SIB by broadcast; and operating the receiver circuitry and the transmitter circuitry in accordance with the indication.

Example Embodiment 47

The method of example embodiment 46, further comprising receiving the indication in the first type system information.

Example Embodiment 48

The method of example embodiment 25, wherein a means of sending the request message and/or a means of receiving the requested second type SIB are specified in the first type system information.

Example Embodiment 49

An access node of a radio access network (RAN) comprising:
transmitter circuitry configured to transmit first type system information over a radio interface, the first type system information including availability of a second type system information block (SIB) and an indication of a delivery mode for the available second type SIB, the delivery mode being either periodic broadcast or on-demand basis;
processor circuitry configured to:
establish a radio connection with a wireless terminal;
mark the connection state of the wireless terminal as a connected state;
receiver circuitry configured to receive from the wireless terminal in the connected state a request message to request delivery of the second type SIB which is available by on-demand basis;
wherein the transmitter circuitry is further configured to transmit the second type SIB to the wireless terminal.

Example Embodiment 50

The access node of example embodiment 49, wherein:
the first type system information includes availability of plural second type system information blocks (SIBs) and an indication of a delivery mode for the available plural second type SIBs,
the receiver circuitry configured to receive from the wireless terminal in the connected state the request message to request delivery of the plural second type SIBs which are available by on-demand basis; and,
the transmitter circuitry is configured to transmit the plural second type SIB to the wireless terminal.

Example Embodiment 51

The access node of example embodiment 49, wherein the access node is configured to transmit the first type system information by periodic broadcast.

Example Embodiment 52

The access node of example embodiment 49, wherein the access node is configured to transmit the first type system information transmitted on dedicated downlink resources to the wireless terminal in the connected state.

Example Embodiment 53

The access node of example embodiment 49, wherein the access node is configured to receive the request message on dedicated uplink resources.

Example Embodiment 54

The access node of example embodiment 53, wherein the access node is further configured to transmit the requested second type SIB on dedicated downlink resources.

Example Embodiment 55

The access node of example embodiment 53, wherein the access node is further configured to transmit the requested second type SIB by broadcast.

Example Embodiment 56

The access node of example embodiment 55, wherein the access node is further configured to transmit the requested second type SIB by broadcast.

Example Embodiment 57

The access node of example embodiment 49, wherein the request message comprises a random access preamble sequence designated for one or more second type SIBs selected for the request message.

Example Embodiment 58

The access node of example embodiment 57, wherein the access node is further configured to transmit a random access response as an acknowledgement of the random access preamble sequence.

Example Embodiment 59

The access node of example embodiment 57, wherein the access node is further configured to transmit the second type SIB by broadcast.

Example Embodiment 60

The access node of example embodiment 59, wherein the first type system information includes scheduling information for broadcast of the available second type SIB.

Example Embodiment 61

The access node of example embodiment 49, wherein the request message is included or concatenated with another signaling message.

Example Embodiment 62

The access node of example embodiment 61, wherein the another signaling message comprises a message of a connection establishment procedure.

Example Embodiment 63

The access node of example embodiment 61, wherein the another signaling message comprises a RRCConnectionSetupComplete message, a RRCResumeComplete message, or a RRCConnectionReconfigurationComplete message.

Example Embodiment 64

The access node of example embodiment 49, wherein a means of receiving the request message and/or a means of transmitting the requested second type SIB are pre-determined, the means of sending the request message being either dedicated signaling or random access preamble sequence, the means of receiving the requested second type SIB being either broadcast or dedicated signaling.

Example Embodiment 65

The access node of example embodiment 49, wherein the transmitter circuitry is configured to transmit over the radio interface an indication of which in which one of plural possible modes the wireless terminal is to operate for requesting and receiving second type SIB, the plural possible modes including at least two of:
  requesting the second type SIB using dedicated uplink resources and receiving the second type SIB using dedicated downlink resources;
  requesting the second type SIB using dedicated uplink resources and receiving the second type SIB by broadcast;
  requesting the second type SIB using a random access preamble dedicated uplink resources and receiving the second type SIB by broadcast.

Example Embodiment 66

The access node of example embodiment 65, wherein the transmitter circuitry is further configured to transmit the indication in the first type system information.

Example Embodiment 67

The access node of example embodiment 49, wherein a means of receiving the request message and/or a means of transmitting the requested second type SIB are specified in the first type system information.

Example Embodiment 68

A method in an access node of a radio access network (RAN) comprising:
  transmitting first type system information over a radio interface, the first type system information including availability of a second type system information block (SIB) and an indication of a delivery mode for the available second type SIB, the delivery mode being either periodic broadcast or on-demand basis;
  establishing a radio connection with a wireless terminal;
  marking the connection state of the wireless terminal as a connected state;
  receiving from the wireless terminal in the connected state a request message to request delivery of second type SIB which is available by on-demand basis;
  transmitting the second type SIB to the wireless terminal.

Example Embodiment 69

The method of example embodiment 68, wherein the first type system information includes availability of plural second type system information blocks (SIBs) and an indication of a delivery mode for the available plural second type SIBs, and the method further comprises:
  receiving from the wireless terminal in the connected state the request message to request delivery of the plural second type SIBs which are available by on-demand basis; and
  transmitting the plural second type SIBs to the wireless terminal.

Example Embodiment 70

The method of example embodiment 68, further comprising transmitting the first type system information by periodic broadcast.

Example Embodiment 71

The method of example embodiment 68, wherein comprising transmitting the first type system information transmitted on dedicated downlink resources to the wireless terminal in the connected state.

Example Embodiment 72

The method of example embodiment 68, wherein comprising receiving the request message on dedicated uplink resources.

Example Embodiment 73

The method of example embodiment 72, wherein further comprising transmitting the requested second type SIB on dedicated downlink resources.

Example Embodiment 74

The method of example embodiment 72, wherein further comprising transmitting the requested second type SIB by broadcast.

Example Embodiment 75

The method of example embodiment 74, wherein the first type system information includes scheduling information for broadcast of the available second type SIB.

Example Embodiment 76

The method of example embodiment 68, wherein the request message comprises a random access preamble sequence designated for one or more second type SIBs selected for the request message.

Example Embodiment 77

The method of example embodiment 76, wherein further comprising transmitting a random access response as an acknowledgement of the random access preamble sequence.

Example Embodiment 78

The method of example embodiment 76, wherein further comprising transmitting the second type SIB by broadcast.

Example Embodiment 79

The method of example embodiment 78, wherein the first type system information includes scheduling information for broadcast of the available second type SIB.

Example Embodiment 80

The method of example embodiment 68, wherein the request message is included or concatenated with another signaling message.

Example Embodiment 81

The method of example embodiment 80, wherein the another signaling message comprises a message of a connection establishment procedure.

Example Embodiment 82

The method of example embodiment 80, wherein the another signaling message comprises a RRCConnectionSetupComplete message, a RRCResumeComplete message, or a RRCConnectionReconfigurationComplete message.

Example Embodiment 83

The method of example embodiment 68, wherein a means of receiving the request message and/or a means of transmitting the requested second type SIB are pre-determined, the means of sending the request message being either dedicated signaling or random access preamble sequence, the means of receiving the requested second type SIB being either broadcast or dedicated signaling.

Example Embodiment 84

The method of example embodiment 68, further comprising:
transmitting over the radio interface an indication of which in which one of plural possible modes the wireless terminal is to operate for requesting and receiving second type SIB, the plural possible modes including at least two of:
requesting the second type SIB using dedicated uplink resources and receiving the second type SIB using dedicated downlink resources;
requesting the second type SIB using dedicated uplink resources and receiving the second type SIB by broadcast;
requesting the second type SIB using a random access preamble dedicated uplink resources and receiving the second type SIB by broadcast.

Example Embodiment 85

The method of example embodiment 84, further comprising transmitting the indication in the first type system information.

Example Embodiment 86

The method of example embodiment 68, wherein a means of receiving the request message and/or a means of transmitting the requested second type SIB are specified in the first type system information.

Example Embodiment 86

A wireless terminal which communicates over a radio interface with access nodes of a radio access network (RAN), the wireless terminal comprising:
processor circuitry configured to:
establish a radio connection;
cause the wireless terminal to enter a connected state;
receiver circuitry configured to receive a reconfiguration message via a dedicated signaling while in the connected state;
wherein the reconfiguration message includes a first type system information including scheduling information of one or more second type system information blocks (SIBs) and at least one delivery mode indication for the second type SIBs, the delivery mode indication being either periodic broadcast or on-demand basis.

Example Embodiment 87

The wireless terminal of Example Embodiment 86, wherein the reconfiguration message instructs the wireless terminal to perform a handover to a target cell, and the first type system information is to be used for the target cell.

Example Embodiment 88

The wireless terminal of Example Embodiment 86, wherein the wireless terminal further comprises transmitter circuitry configured to transmit a request message for at least one of the second type SIBs in a case where the delivery mode indication of the SIB is on-demand basis.

Example Embodiment 89

The wireless terminal of Example Embodiment 88, wherein the receiver circuitry further receives the requested second type SIB.

Example Embodiment 89

An access node of a radio access network (RAN) comprising:
processor circuitry configured to:
establish a radio connection with a wireless terminal;
mark the connection state of the wireless terminal as a connected state;
transmitter circuitry configured to transmit to the wireless terminal a reconfiguration message via a dedicated signaling while the wireless terminal is in the connected state;
wherein the configuration message includes a first type system information including scheduling information of one or more second type system information blocks (SIBs) and at least one delivery mode indication for the second type SIBs, the delivery mode indication being either periodic broadcast or on-demand basis.

Example Embodiment 90

The access node of Example Embodiment 89, wherein the reconfiguration message instructs the wireless terminal to perform a handover to a target cell, and the first type system information is to be used for the target cell.

Example Embodiment 91

The access node of Example Embodiment 89, wherein the access node further comprises receiver circuitry configured to receive a request message for at least one of the second type SIBs in a case where the delivery mode indication of the SIB is on-demand basis.

Example Embodiment 92

The access node of Example Embodiment 91, wherein the transmitter circuitry further transmits the requested second type SIB.

Example Embodiment 93

A method in a wireless terminal which communicates over a radio interface with access nodes of a radio access network (RAN), the method comprising:
establishing a radio connection;
entering a connected state;
receiving a reconfiguration message via a dedicated signaling while in the connected state;
wherein the reconfiguration message includes a first type system information including scheduling information of one or more second type system information blocks (SIBs) and at least one delivery mode indication for the second type SIBs, the delivery mode indication being either periodic broadcast or on-demand basis.

Example Embodiment 94

The method of Example Embodiment 93, wherein the reconfiguration message instructs the wireless terminal to perform a handover to a target cell, and the first type system information is to be used for the target cell.

Example Embodiment 95

The method of Example Embodiment 93, wherein further transmitting a request message for at least one of the second type SIBs in a case where the delivery mode indication of the SIB is on-demand basis.

Example Embodiment 96

The method of Example Embodiment 95, wherein further receiving the requested second type SIB.

Example Embodiment 97

A method in an access node of a radio access network (RAN) comprising:
establishing a radio connection with a wireless terminal;
marking the connection state of the wireless terminal as a connected state;
transmitting to the wireless terminal a reconfiguration message via a dedicated signaling while the wireless terminal is in the connected state;
wherein the configuration message includes a first type system information including scheduling information of one or more second type system information blocks (SIBs) and at least one delivery mode indication for the second type SIBs, the delivery mode indication being either periodic broadcast or on-demand basis.

Example Embodiment 98

The method of Example Embodiment 97, wherein the reconfiguration message instructs the wireless terminal to perform a handover to a target cell, and the first type system information is to be used for the target cell.

Example Embodiment 99

The method of Example Embodiment 97, wherein further receiving a request message for at least one of the second type SIBs in a case where the delivery mode indication of the SIB is on-demand basis.

Example Embodiment 100

The access node of Example Embodiment 99, wherein further transmitting the requested second type SIB.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture. The instructions of such software are stored on non-transient computer readable media.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

It will be appreciated that the technology disclosed herein is directed to solving radio communications-centric issues and is necessarily rooted in computer technology and overcomes problems specifically arising in radio communications. Moreover, in at least one of its aspects the technology disclosed herein improves the functioning of the basic function of a wireless terminal and/or node itself so that, for example, the wireless terminal and/or node can operate more effectively by prudent use of radio resources, e.g., by judiciously timing the transmission and reception of system information such as Other SI.

It should be understood that features of two or more of the foregoing example embodiments and modes may be combined with one another in further implementations or example embodiments and mode.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A wireless terminal which communicates over a radio interface with access nodes of a radio access network (RAN), the wireless terminal comprising:
    processor circuitry configured to:
        establish a radio connection;
        cause the wireless terminal to enter a connected state;
    receiver circuitry configured to receive, in the connected state, a reconfiguration message via signaling dedicated to the wireless terminal, the reconfiguration message comprising first type system information, the first type system information comprising scheduling information of one or more second type system information blocks (SIBs) and at least one delivery mode indication for the second type SIBs, the delivery mode indication being either periodic broadcast or on-demand basis, the first type system information being used for receiving minimum system information, the minimum system information comprising, at least, information required for an initial access, the one or more second type SIBs being used for receiving system information other than the minimum system information;
    the receiver circuitry is configured, in a case where the delivery mode indication for the at least one on the second type SIBs is periodic broadcast, to receive the at least one of the second type SIBs;
    transmitter circuitry configured, in a case where the delivery mode indication for the at least one of the second type SIBs is on-demand basis, to transmit, in the connected state, a request message for at least one of the second type SIBs;
    the receiver circuitry is configured to receive, in the connected state, in a case where the delivery mode indication for the at least one of the second type SIBs is on-demand basis, the at least one of the second type SIBs using a message via signaling dedicated to the wireless terminal.

2. The wireless terminal of claim 1, wherein the reconfiguration message instructs the wireless terminal to perform a handover to a target cell, and the first type system information is to be used for the target cell.

3. An access node of a radio access network (RAN) comprising:
    processor circuitry configured to:
        establish a radio connection with a wireless terminal;
        mark the connection state of the wireless terminal as a connected state;
    transmitter circuitry configured to transmit to the wireless terminal a reconfiguration message via signaling dedicated to the wireless terminal while the wireless terminal is in the connected state,
    the configuration message comprising first type system information, the first type information comprising scheduling information of one or more second type system information blocks (SIBs) and at least one delivery mode indication for the second type SIBs, the delivery mode indication being either periodic broadcast or on-demand basis, the first type system information being used for receiving minimum system information, the minimum system information comprising, at least, information required for an initial access, the one or more second type SIBs being used for receiving system information other than the minimum system information; and
    the transmitter circuitry is configured, in a case where the delivery mode indication for the at least one of the second type SIBs is periodic broadcast, to transmit the at least one of the second type SIBs using periodic broadcast;
    receiver circuitry configured to receive, from the wireless terminal, while the wireless terminal is in the connected state, in a case where the delivery mode indication for the at least one of the second type SIBs; wherein
    the transmitter circuitry is configured to transmit, to the wireless terminal, while the wireless terminal is in the connected state, the at least one of the second type SIBs using a message via signaling dedicated to the wireless terminal.

4. The access node of claim 3, wherein the reconfiguration message instructs the wireless terminal to perform a handover to a target cell, and the first type system information is to be used for the target cell.

5. A method in a wireless terminal which communicates over a radio interface with access nodes of a radio access network (RAN), the method comprising:
 establishing a radio connection;
 entering a connected state;
 receiving, in the connected state, a reconfiguration message via signaling dedicated to the wireless terminal while in the connected state,
 the reconfiguration message comprising first type system information, the first type system information comprising scheduling information of one or more second type system information blocks (SIBs) and at least one delivery mode indication for the second type SIBs, the delivery mode indication being either periodic broadcast or on-demand basis, the first type system information being used for receiving minimum system information, the minimum system information comprising, at least, information required for an initial access, the one or more second type SIBs being used for receiving system information other than the minimum system information;
 in a case where the delivery mode indication for the at least one on the second type SIBs is periodic broadcast, receiving the at least one of the second type SIBs;
 in a case where the delivery mode indication for the at least one of the second type SIBs is on-demand basis:
  transmitting, in the connected state, a request message for at least one of the second type SIBs; and
  receiving, in the connected state, the at least one of the second type SIBs using a message via signaling dedicated to the wireless terminal.

6. The method of claim 5, wherein the reconfiguration message instructs the wireless terminal to perform a handover to a target cell, and the first type system information is to be used for the target cell.

7. A method in an access node of a radio access network (RAN) comprising:
 establishing a radio connection with a wireless terminal;
 marking the connection state of the wireless terminal as a connected state;
 transmitting to the wireless terminal a reconfiguration message via a signaling dedicated to the wireless terminal while the wireless terminal is in the connected state,
 the configuration message comprising first type system information, the first type system information comprising scheduling information of one or more second type system information blocks (SIBs) and at least one delivery mode indication for the second type SIBs, the delivery mode indication being either periodic broadcast or on-demand basis, the first type system information being used for receiving minimum system information, the minimum system information comprising, at least, information required for an initial access, the one or more second type SIBs being used for receiving system information other than the minimum system information;
 in a case where the delivery mode indication for the at least one of the second type SIBs is periodic broadcast, transmitting the at least one of the second type SIBs using periodic broadcast
 in a case where the delivery mode indication for the at least one of the second type SIBs is on-demand basis:
  receiving, from the wireless terminal, while the wireless terminal is in the connected state, a request message for at least one of the second type SIBs; and
  transmitting, to the wireless terminal, while the wireless terminal is in the connected state, the at least one of the second type SIBs using a message via signaling dedicated to the wireless terminal.

8. The method of claim 7, wherein the reconfiguration message instructs the wireless terminal to perform a handover to a target cell, and the first type system information is to be used for the target cell.

* * * * *